(12) United States Patent
Pacheco-Rodriguez et al.

(10) Patent No.: US 12,627,141 B2
(45) Date of Patent: May 12, 2026

(54) SYSTEMS AND METHODS FOR FACILITATING THE MANAGEMENT OF ENERGY PRODUCTION OR PROCESSING FACILITIES

(71) Applicants: BP CORPORATION NORTH AMERICA INC., Houston, TX (US); BP EXPLORATION OPERATING COMPANY LIMITED, Middlesex (GB)

(72) Inventors: Jesus Pacheco-Rodriguez, Houston, TX (US); Joshua Ellison, Katy, TX (US); Greg Hickey, Leatherhead (GB); Adam Ballard, Katy, TX (US); Martin R. Gonzalez, Mokena, IL (US)

(73) Assignee: BP Corporation North America Inc., Houston, TX (US)

( * ) Notice: Subject to any disclaimer, the term of this patent is extended or adjusted under 35 U.S.C. 154(b) by 474 days.

(21) Appl. No.: 18/275,005

(22) PCT Filed: Feb. 11, 2022

(86) PCT No.: PCT/US2022/016165
§ 371 (c)(1),
(2) Date: Jul. 29, 2023

(87) PCT Pub. No.: WO2022/174066
PCT Pub. Date: Aug. 18, 2022

(65) Prior Publication Data
US 2024/0154413 A1 May 9, 2024

Related U.S. Application Data

(60) Provisional application No. 63/148,340, filed on Feb. 11, 2021.

(51) Int. Cl.
*H02J 3/00* (2006.01)
*H02J 3/001* (2026.01)

(52) U.S. Cl.
CPC .............. *H02J 3/001* (2020.01); *H02J 3/004* (2020.01)

(58) Field of Classification Search
CPC ...... H02J 3/001; H02J 3/004; G05B 23/0248; G05B 2219/40446; G05B 23/0283; G05B 23/0275
See application file for complete search history.

(56) References Cited

U.S. PATENT DOCUMENTS

| | | | |
|---|---|---|---|
| 11,079,744 B2 * | 8/2021 | Chauvet | .............. H04L 12/4641 |
| 2010/0286937 A1 * | 11/2010 | Hedley | .................. G06Q 50/06 702/60 |

(Continued)

OTHER PUBLICATIONS

PCT/US2022/016165 International Search Report and Written Opinion dated Aug. 4, 2022 (16 p.).

*Primary Examiner* — Ziaul Karim

(74) *Attorney, Agent, or Firm* — Conley Rose, P.C.

(57) ABSTRACT

A method for facilitating the management of one or more energy production or processing facilities includes receiving an alert corresponding to an operational anomaly associated with the process equipment, interrogating a data structure linking together and organizing a plurality of distinct data sources, selecting a subset of data sources from the plurality of data sources identified as associated with a potential cause of the alert based on the interrogation of the data structure, statistically analyzing data sourced from the selected subset of data sources, identifying the potential cause of the alert based on the statistical analysis, and recommending a corrective action to resolve the identified potential cause of the alert using the plurality of distinct data sources.

14 Claims, 9 Drawing Sheets

(56)  References Cited

U.S. PATENT DOCUMENTS

| | | | |
|---|---|---|---|
| 2013/0268812 A1* | 10/2013 | Liu | G06F 11/0766 |
| | | | 700/286 |
| 2018/0284756 A1* | 10/2018 | Cella | G01M 13/045 |
| 2022/0066456 A1* | 3/2022 | Ebrahimi Afrouzi | |
| | | | G06F 3/04883 |
| 2024/0310851 A1* | 9/2024 | Ebrahimi Afrouzi | G01S 17/87 |

* cited by examiner

Region 1 Region

Facility 1 Facility

EQ1 Equipment

Equipment Triage ⟋70

Five work orders have been completed in prior six months.

Yesterday's average vibration for EQ1 was 0.5 MILS which is higher than recent history of 0.05 MILS.

Yesterday's average inlet temperature for EQ1 was 100 °F which is higher than recent history of 95 °F Yesterday's average total flow for EQ1 was 50 MMSCFD which is higher than recent history of 5 MMSCFD.

Yesterday's average vale position for EQ1 was 10% OPEN which is lower than recent history of 25% OPEN.

Overall Status ⟋71

| Parameter | Average Value | Unit |
|---|---|---|
| Vibration | 0.5 | MILS |
| Inlet Temp | 100 | °F |
| Total Flow | 50 | MMSCFD |

Vulnerabilities ⟋74

—

Maintenance Data ⟋72

| Work Order Number | Functional Location | Start Date | Work Order Description | Status |
|---|---|---|---|---|
| — | — | — | — | — |

Alerts ⟋73

| Monitoring System | Alert Identity | Start Time | End Time | Alert Disposition |
|---|---|---|---|---|
| — | — | — | — | — |

Region 1

Network

248

240

Computer System

242  OS

244  App

304  Memory

CPU

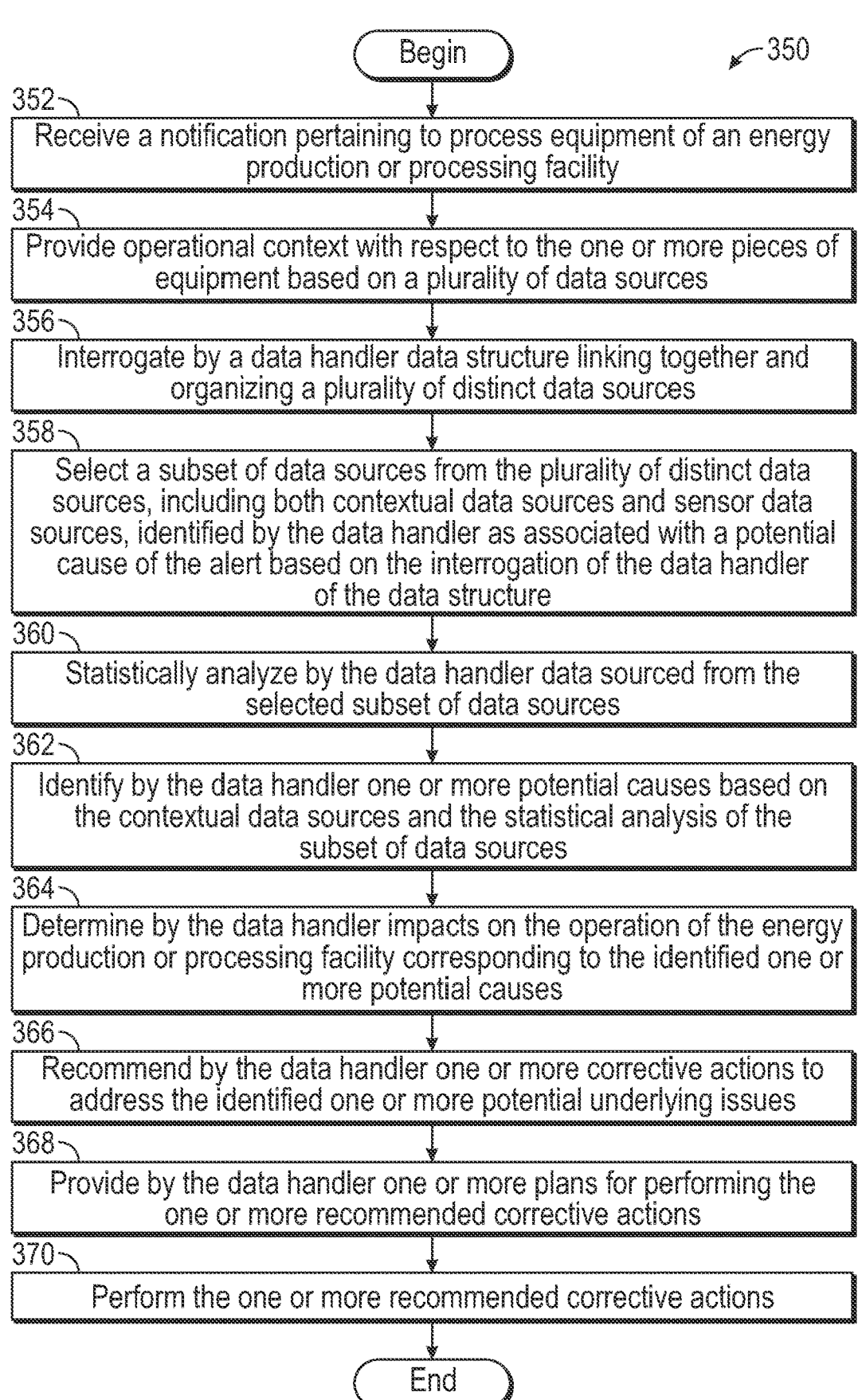

Begin

350

352 — Receive a notification pertaining to process equipment of an energy production or processing facility 354 — Provide operational context with respect to the one or more pieces of equipment based on a plurality of data sources 356 — Interrogate by a data handler data structure linking together and organizing a plurality of distinct data sources 358 — Select a subset of data sources from the plurality of distinct data sources, including both contextual data sources and sensor data sources, identified by the data handler as associated with a potential cause of the alert based on the interrogation of the data handler of the data structure 360 — Statistically analyze by the data handler data sourced from the selected subset of data sources 362 — Identify by the data handler one or more potential causes based on the contextual data sources and the statistical analysis of the subset of data sources 364 — Determine by the data handler impacts on the operation of the energy production or processing facility corresponding to the identified one or more potential causes 366 — Recommend by the data handler one or more corrective actions to address the identified one or more potential underlying issues 368 — Provide by the data handler one or more plans for performing the one or more recommended corrective actions 370 — Perform the one or more recommended corrective actions End

FIG. 10

SYSTEMS AND METHODS FOR FACILITATING THE MANAGEMENT OF ENERGY PRODUCTION OR PROCESSING FACILITIES

CROSS-REFERENCE TO RELATED APPLICATIONS

The present application is a 35 U.S.C. § 371 national stage application of PCT/US2022/016165 filed Feb. 11, 2022, and entitled "Systems and Methods for Facilitating the Management of Energy Production or Processing Facilities," which claims benefit of U.S. provisional patent application No. 63/148,340 filed Feb. 11, 2021, entitled "Systems and Methods for Facilitating the Management of Hydrocarbon Production and Operation Facilities," each of which is incorporated herein by reference in its entirety for all purposes.

STATEMENT REGARDING FEDERALLY SPONSORED RESEARCH OR DEVELOPMENT

Not applicable.

BACKGROUND

Energy production and processing facilities are used to extract and process different sources of energy to be ultimately consumed by one or more end users. For example, energy production and processing facilities encompass photovoltaic systems which convert captured sunlight into electrical power distributed to, for example, an electrical grid, a wind farm which converts wind energy into electrical power, and hydrocarbon production and processing facilities which extract hydrocarbons from the earth and process the captured hydrocarbons into hydrocarbon products usable by end users Energy production and processing facilities may comprise a variety of process equipment for performing various functions including, for example, transmitting and/or processing different forms of energy (e.g., electrical energy, wind energy, chemical energy in the form of hydrocarbons, etc.), electromechanical equipment used to power equipment, and/or convert different types of energy (e.g., a generator which converts torque applied from wind power into electrical energy), and equipment used to handle and/or process various types of fluids such as, for example, process equipment of a hydrocarbon production or processing facility. As one example, hydrocarbon production and processing facilities may include process equipment in the form of stationary equipment (e.g., fluid conduits, valves, heat exchangers, vessels, separators, etc.), rotating equipment (e.g., compressors, pumps, turbines, etc.) as well as other types of process equipment.

Personnel, including subject matter experts (SMEs), may be tasked with monitoring and assisting with the management of the stationary, rotating, and other types of equipment comprising one or more energy production or processing facilities. In an effort to assist with managing one or more energy production or processing facilities, SMEs may provide technical support should anomalies arise at the one or more energy production or processing facilities. For example, SMEs may process alerts received from an energy production or processing facility and pertaining to process equipment of the energy production or processing facility. Particularly, in at least some applications, SMEs may prioritize the alert with respect to other alerts received from the energy production or processing facility as well as other energy production or processing facilities, determine or identify the issue underlying the alert, determine a plan for addressing the underlying cause on information related to the piece of equipment pertaining to the alert as well as other information pertaining to the energy production or processing facility, and perform an action to resolve the underlying cause.

SUMMARY

An embodiment of a method for facilitating the management of one or more energy production or processing facilities comprises (a) receiving by an application executing on a computer system an alert pertaining to process equipment of the one or more energy production or processing facilities, the alert corresponding to an operational anomaly associated with the process equipment, (b) interrogating by a data handler of the application a data structure linking together and organizing a plurality of distinct data sources, the plurality of distinct data sources having a sensor data class associated with sensor data sources of the process equipment, and a contextual data class associated with contextual data sources excluding the sensor data sources of the sensor data class, (c) selecting a subset of data sources from the plurality of data sources, including both contextual data sources and sensor data sources, identified by the data handler as associated with a potential cause of the alert based on the interrogation of the data structure, (d) statistically analyzing by the data handler data sourced from the selected subset of data sources, (e) identifying by the data handler the potential cause of the alert based on the contextual data sources within the subset of data sources and the statistical analysis performed at (d), and (f) recommending by the data handler a corrective action to resolve the identified potential cause of the alert using the plurality of distinct data sources. In some embodiments, (f) includes determining a severity of impact to the operation of the one or more energy production or processing facilities should failure occur to the process equipment. In some embodiments, (f) further comprises recommending by the data handler a particular corrective action from a plurality of distinct potential corrective actions to resolve the identified potential cause of the alert based on the severity of impact to the operation of the one or more energy production or processing facilities should failure occur to the process equipment. In certain embodiments, (e) further comprises interrogating the data structure by the data handler to identify the potential cause of the alert. In certain embodiments, the statistical analysis in (d) identifies anomalous sensor data, and wherein interrogation of the data structure to select a subset of data sources at (c) is based on identifying, by the linking and organizing of the data structure, other data sources linked with the data source associated with the anomalous sensor data. In some embodiments, (b) comprises forming by the data handler new associations between different data sources of the plurality of distinct data sources. In some embodiments, the contextual data source class includes at least one of maintenance history data specific to the process equipment, maintenance history data of the one or more energy production or processing facilities, planned maintenance data, design data specific to the process equipment, current operating condition data associated with a current operational status of the process equipment and/or of the one or more energy production or processing facilities, alert data relating to equipment of the one or more energy production or processing facilities, failure mode data, and safety data. In certain embodiments, (e) comprises (e1) identifying the potential cause of the alert by identifying a plurality of anomalous data streams of the plurality distinct data sources based on the statistical analysis performed at (d). In certain embodiments, (e) comprises (e2) determining by the data handler an anomaly score for each of the identified anomalous data streams. In some embodiments, (e) comprises (e2) determining a likelihood of a failure for each of a plurality of sub-components of the process equipment based on the plurality of anomalous data streams. In some embodiments, (e) comprises (e3) identifying one or more potential failure modes for each of the plurality of sub-components based on the plurality of anomalous data streams. In some embodiments, the data structure comprises a knowledge graph accessible by the data handler and comprising a plurality of nodes connected by a plurality of edges, and wherein at least one of the plurality of nodes comprises an equipment identifier node representing the process equipment.

An embodiment of a method for facilitating the management of one or more energy production or processing facilities comprises (a) receiving by an application executing on a computer system an alert pertaining to a process equipment of the one or more energy production or processing facilities, the alert corresponding to an operational anomaly in the operation of the process equipment, (b) interrogating by the data handler a data structure linking together and organizing a plurality of distinct data sources, (c) selecting a subset of data sources from the plurality of distinct data sources identified by the data handler as associated with a potential cause of the alert based on the interrogation of the data structure, (d) statistically analyzing by the data handler data sourced from the selected subset of data sources, (e) identifying by the data handler the potential cause of the alert based on the statistical analysis performed at (d), and (f) recommending by the data handler a corrective action to resolve the identified potential cause of the alert using the plurality of distinct data sources, wherein and the data structure comprises a knowledge graph including a plurality of nodes connected by a plurality of edges, and wherein at least one of the plurality of nodes comprises an equipment identifier node representing the process equipment. In some embodiments, the plurality of nodes of the knowledge graph comprises a model identifier node representing an analytic model associated with the process equipment, and a data stream node representing a data stream of the plurality of distinct data sources, an anomaly identifier node identifying a data anomaly in a data stream associated with the process equipment. In some embodiments, the model identifier node is connected to the equipment identifier node by a model edge which indicates that the analytic model represented by the model identifier node performs analysis on the process equipment represented by the equipment identifier node, the equipment identifier node is connected to the data stream node by a measured data edge which indicates that the data stream represented by the data stream node is measured by sensors associated with the process equipment represented by the equipment identifier node, and the model identifier node is connected to the data stream node by a data model edge which indicates that the data stream represented by the data stream node is used in the analytic model represented by the model identifier node. In certain embodiments, the plurality of nodes of the knowledge graph comprises at least one of a trip node which represents a condition that when identified in the data stream represented by the data stream node causes an effect on another process equipment of the one or more energy production or processing facilities, and a failure mode node connected to the equipment identifier node by a failure edge which indicates that a failure mode represented by the failure mode node may occur in the process equipment represented by the equipment identifier node. In certain embodiments, (f) includes determining a severity of impact to the operation of the one or more energy production or processing facilities should failure occur to the process equipment. In certain embodiments, (f) further comprises recommending by the data handler a particular corrective action from a plurality of distinct potential corrective actions to resolve the identified potential cause of the alert based on the severity of impact to the operation of the one or more energy production or processing facilities should failure occur to the process equipment. In some embodiments, the method further comprises (g) providing by the data handler a plan for performing the recommended corrective action, and (h) performing the recommended corrective action. In some embodiments, the statistical analysis in (d) identifies anomalous sensor data, and wherein interrogation of the data structure to select a subset of data sources at (c) is based on identifying, by the linking and organizing of the data structure, other data sources linked with the data source associated with the anomalous sensor data. In certain embodiments, (e) comprises (e1) identifying the potential cause of the alert by identifying by the data handler a plurality of anomalous data streams of the plurality distinct data sources, and (e2) identifying one or more potential failure modes of the process equipment by the data handler based on the plurality of anomalous data streams.

An embodiment of a system for facilitating the management of one or more energy production or processing facilities comprises a processor, a non-transitory memory, and an application stored in the non-transitory memory that, when executed by the processor receives an alert pertaining to a process equipment of the one or more energy production or processing facilities, the alert corresponding to an operational anomaly in the operation of the process equipment, interrogates by a data handler of the application a data structure linking together and organizing a plurality of distinct data sources, the plurality of distinct data sources having a sensor data class associated with sensor data sources of the process equipment, and a contextual data class associated with contextual data sources excluding the sensor data sources of the sensor data class, selects a subset of data sources from the plurality of distinct data sources, including both contextual data sources and sensor data sources, identified by the data handler as associated with a potential cause of the alert based on the interrogation of the data structure, statistically analyzes by the data handler data sourced from the selected subset of data sources, identifies by the data handler the potential cause of the alert based on the contextual data sources within the subsea of data sources and the performed statistical analysis, and recommends by the data handler a corrective action to resolve the identified potential cause of the alert using the plurality of distinct data sources. In some embodiments, the application stored in the non-transitory memory that, when executed by the processor determines a severity of impact to the operation of the one or more energy production or processing facilities should failure occur to the process equipment. In some embodiments, the application stored in the non-transitory memory that, when executed by the processor recommends by the data handler a particular corrective action from a plurality of distinct potential corrective actions to resolve the identified potential cause of the alert based on the severity of impact to the operation of the one or more energy production or processing facilities should failure occur to the process equipment. In certain embodiments, the data source comprises a knowledge graph including a plurality of nodes connected by a plurality of edges, and wherein at least one of the plurality of nodes comprises an equipment identifier node representing the process equipment. In certain embodiments, the application stored in the non-transitory memory that, when executed by the processor identifies the potential cause of the alert by identifying by the data handler a plurality of anomalous data streams of the plurality distinct data sources, determines a likelihood of a failure for each of a plurality of sub-components of the piece of equipment based on the plurality of anomalous data streams, and identifies one or more potential failure modes for each of the plurality of sub-components based on the plurality of anomalous data streams. In some embodiments, the application stored in the non-transitory memory that, when executed by the processor identifies anomalous sensor data based on the performed statistical analysis, and selects the subset of data sources based on identifying, by the linking and organizing of the data structure, other data sources linked with the data source associated with the anomalous sensor data.

BRIEF DESCRIPTION OF THE DRAWINGS

For a detailed description of various exemplary embodiments, reference will now be made to the accompanying drawings in which:

FIGS. 4-7 are graphic illustrations of first user interface of the system of FIG. 1 according to some embodiments;

FIG. 8 is a schematic view of another system for overseeing or facilitating the management of one or more hydrocarbon energy production or processing facilities according to some embodiments;

FIG. 9 is a block diagram of an embodiment of a computer system according to some embodiments; and FIG. 10 is a flowchart of a method for overseeing or facilitating the management of one or more hydrocarbon energy production or processing facilities according to some embodiments.

DETAILED DESCRIPTION

Figure 1:
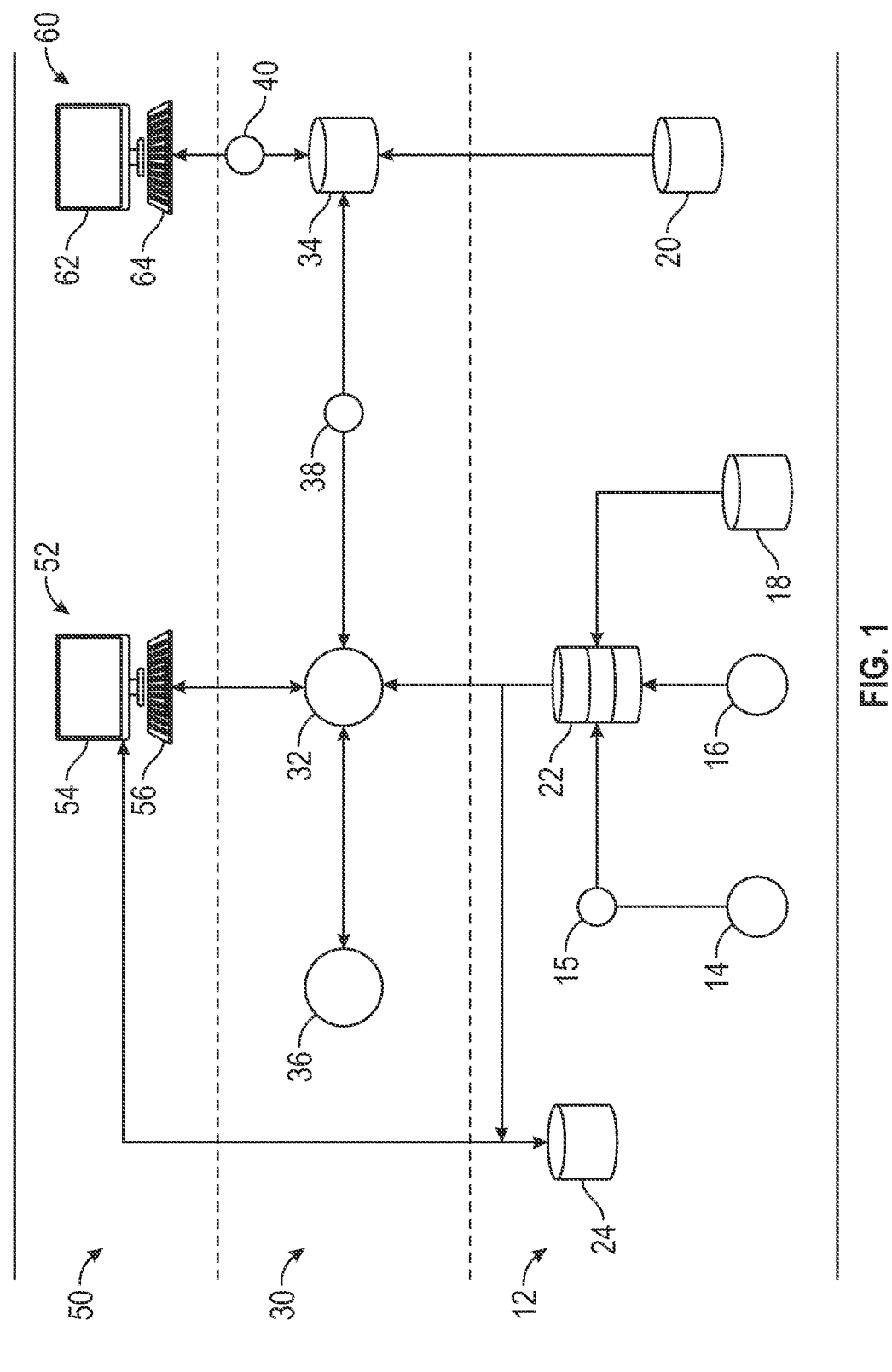
FIG. 1 is a schematic view of a system for overseeing or facilitating the management of one or more hydrocarbon energy production or processing facilities according to some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, SMEs may oversee and assist in supporting the management of one or more energy production or processing facilities. As part of that process, SMEs may be tasked with analyzing alerts received from one or more of the energy production or processing facilities pertaining to various types of anomalies associated with process equipment of the energy production or processing facilities, such as anomalies pertaining to stationary, rotating, and other types of process equipment. The alerts may be generated by one or more monitoring tools associated with the equipment for which the alert pertains.

Upon receiving an alert, SMEs tasked with managing the energy production or processing facility from which the alert pertains may manually examine a variety of types of information in order to properly investigate and analyze the alert so that the underlying cause symptomatized by the alert may be properly understood. The sources of information analyzed by SMEs in this effort may comprise, for example, monitoring tools associated with the energy production or processing facility, equipment sensor data, operational data, production data, maintenance data, the equipment hierarchy of the energy production or processing facility, engineering data, failure mode, effects & criticality (FMECA) data, safety studies, daily logs, case management data, materials data, lessons learned, planning and scheduling data, etc. Once the SMEs have identified and properly understood the underlying cause, the SMEs may formulate a recommended response for addressing the underlying cause, plan how the recommended response may be carried out in a way to minimize disruption to or otherwise interfere with the operation of the energy production or processing facility, and carry out the recommended response in order to address the underlying cause and resolve the alert.

Given that SMEs may need to manually consult a wide range of sources of information in order to properly analyze the alert and formulate a recommended response to address the underlying cause, resolving a given alert may demand a large amount of time from the SMEs asked with managing a given energy production or processing facility. A significant amount of time may be demanded from the SMEs both to work through the myriad sources of information as well as to perform statistical analysis or "analytics" as well as other complex operations on the collected information, and to understand the relationships between the sources of information and to come to an understanding of the alert and thereby identify the underlying cause which may be triggering the alert. The amount of time demanded from the SMEs to resolve a given alert may limit the SMEs from overseeing or providing support for multiple energy production or processing facilities. Instead, the SMEs may be limited to assisting in the management of a single energy production or processing facility or a specific unit of a single energy production or processing facility in order that the SMEs may have enough time available to address the issues which arise in the single energy production or processing facility or specific unit of the energy production or processing facility. SMEs may also be limited to providing support for a single energy production or processing facility to allow the SMEs to develop sufficient familiarity with the energy production or processing facility so that the SMEs may more efficiently resolve alerts pertaining to the facility. Thus, the limitations associated with requiring SMEs to manually consult a variety of different data sources in order to analyze a received alert and to formulate a recommended response may reduce the efficiency of the SMEs in resolving alerts as they arise. These limitations may also prevent SMEs from overseeing and assisting in the management of a plurality of different energy production or processing facilities, hindering the centralization of management operations across an entire fleet of energy production or processing facilities.

Accordingly, embodiments of systems and methods for overseeing or facilitating the management of one or more hydrocarbon energy production or processing facilities are disclosed herein which address the issues outlined above. Particularly, a method for facilitating the management of energy production or processing facilities may generally include receiving by an application executing on a computer system an alert pertaining to process equipment of the one or more energy production or processing facilities, interrogating by a data handler of the application a data structure linking together and organizing a plurality of distinct data sources, selecting a subset of data sources from the plurality of distinct data sources identified by the data handler as associated with a potential cause of the alert, statistically analyzing data sourced from the selected subset of data sources, identifying by the data handler the potential cause of the alert using the plurality of distinct data sources and based on the performed statistical analysis, and recommending by the data handler a corrective action to resolve the identified potential cause of the alert using the plurality of distinct data sources and the performed statistical analysis.

The plurality of distinct data sources may have a sensor data class associated with sensor data sources of the process equipment, and a contextual data class associated with contextual data sources excluding the sensor data sources of the sensor data class. For example, the contextual data sources may include, among other things, design data specific to the process equipment, maintenance history data specific to the process equipment and/or specific to the one or more energy production or processing facilities, operating condition data associated with a current operational status of the one or more energy production or processing facilities and/or the process equipment which comprise the process equipment, alert data relating to equipment of the one or more energy production or processing facilities, failure mode data, and/or safety data. Additionally, the data structure which organizes the plurality of distinct data sources may include a knowledge graph accessible by the data handler and comprising a plurality of nodes connected by a plurality of edges, and wherein at least one of the plurality of nodes comprises an equipment identity node representing the piece of equipment.

Further, a system for facilitating the management of energy production or processing facilities may generally include a processor, a non-transitory memory, and an application stored in the non-transitory memory that, when executed by the processor receives an alert pertaining to process equipment of the one or more energy production or processing facilities, receives an alert pertaining to a process equipment of the one or more energy production or processing facilities, the alert corresponding to an operational anomaly in the operation of the process equipment, interrogates by a data handler of the application a data structure linking together and organizing a plurality of distinct data sources, selects a subset of data sources from the plurality of distinct data sources identified by the data handler as associated with a potential cause of the alert based on the interrogation of the data structure, performs statistical analysis data sourced from the selected subset of data sources, identifies by the data handler the potential cause of the alert using the plurality of distinct data sources and based on the performed statistical analysis, and recommends by the data handler a corrective action to resolve the identified potential cause of the alert using the plurality of distinct data sources and the performed statistical analysis Embodiments of systems and methods for facilitating the management of Energy production or processing facilities disclosed herein may significantly reduce the amount of time demanded of SMEs in manually sorting through a plurality of distinct data sources by organizing the plurality of distinct data sources into one or more intelligible graph models which integrates the plurality of distinct data sources, and by automating the process of retrieving and analyzing pertinent information in the interest of providing recommendations for addressing outstanding alerts and other issues pertaining to equipment of the Energy production or processing facilities as they arise.

Referring now to FIG. 1, an embodiment of a system 10 for overseeing or facilitating the management of one or more energy production or processing facilities is shown, Particularly, FIG. 1 illustrates an exemplary architecture of system 10, where features of system 10 may execute upon a computer system not shown in FIG. 1. In this exemplary embodiment, system 10 generally includes a data source layer 12, a data processing layer 30, and a visualization layer 50. System 10 may also be referred to herein as a knowledge engine 10 and is generally configured to accelerate SMEs' response or cycle time in the investigating, analyzing, and planning of corrective actions intended to address issues which arise during the operation of hydrocarbon energy production or processing facilities overseen or managed by the SMEs The data source layer 12 of system 10 generally includes the sources of data utilized by system 10 in assisting in the management of the one or more energy production or processing facilities. In this exemplary embodiment, data source layer 12 generally includes equipment sensor data 14, equipment monitoring systems or tools data 16, equipment maintenance data 18, and piping & instrumentation diagrams (P&IDs) 20. The sources of data provided by data source layer 12 includes both data sources belonging to a sensor data class associated with sensor data of the process equipment of the one or more energy production or processing facilities, and data sources belonging to a contextual data class associated with contextual data which excludes the sensor data of the sensor data class. For example, the equipment sensor data 14 provides sensor data associated with sensor data sources of the sensor data class while the equipment monitoring system data 16, equipment maintenance data 18, and P&IDs 20 belong to the contextual data class.

At least some of the data obtained in the data source layer 12 of system 10 may be stored in a common data store or lake 22 of data source layer 12. In this exemplary embodiment, equipment sensor data 14, equipment monitoring system data 16, and equipment maintenance data 18 are each collected and stored in collective data store 22; however, in other embodiments, various types of data may be stored in collective data store 22 including, for example, P&IDs 20. As will be discussed further herein, collective data store 22 may be in a physical location distal any of the one or more energy production or processing facilities overseen by system 10.

Additionally, while in this exemplary embodiment data source layer 12 is shown as including equipment sensor data 14, equipment monitoring system data 16, equipment maintenance data 18, and P&IDs 20, in other embodiments, data source layer 12 may comprise other types of data in lieu of, or in addition to, the data shown in FIG. 1, For example, in other embodiments, data source layer 12 may comprise, for example, engineering data, FMECA data, safety studies data, operator logs, equipment data sheets, control and safety design and operating data, control and process control settings and performance, historical test records, operating risk assessments, hazard and operability analysis (HAZOP) and layer of protection analysis (LOPA) information, sensor correlation data, simulated planta data and virtual sensor data, case management data, lessons learned data, planning and scheduling data, equipment materials data, etc.

In some embodiments, data source layer 12 includes additional data sources including, for example, equipment design data and current operating condition data. The equipment design data may include information pertaining to the design, configuration, design and/or operational limits, of process equipment of the one or more energy production or processing facilities. Additional process equipment-specific data excluding sensor data may include current process equipment status (e.g., in operation, disabled, etc.). The current operating condition data comprises data associated with a current operational status of the one or more energy production or processing facilities. For example, the current operating condition data may include data pertaining to current conditions of the one or more energy production or processing facilities including, for example, geographical and current weather conditions, current or recently changes to legal or procedural regulations governing the operation of the one or more energy production or processing facilities, operating conditions of particular units or systems of the one or more energy production or processing facilities, etc. For example, the current operating condition data may include information regarding a current shutdown (e.g., for the performance of regularly scheduled maintenance, etc.) of a particular process unit of an energy production or processing facilities which may affect the operation of other process units or equipment. Some of the information comprising the current operating condition data may be sourced locally from the one or more energy production or processing facilities, and/or may be sourced from external sources such as the Internet.

In this exemplary embodiment, equipment sensor data 14 of data source layer 12 comprises real-time streaming time-series data provided from various sensors of the one or more energy production or processing facilities overseen by system 10. For example, equipment sensor data 14 may comprise real-time streaming temperature data, pressure data, flowrate data, and other physical parameters associated with various process equipment of the one or more energy production or processing facilities. The equipment sensor data 14 may be collected in real-time via a plurality of sensors (e.g., temperature sensors, pressure sensors, flow sensors, etc.) coupled to the equipment being monitored. Equipment sensor data 14 may also include metadata such as the identity of each sensor and the identity of the process equipment to which the sensor is associated. Equipment sensor data 14 may be collected in real-time for storage in collective data store 22 via a data curator 15 in signal communication with both collective data store 22 and the plurality of sensors used to provide equipment sensor data 14.

Equipment monitoring system data 16 of data source layer 12 may include data outputted or provided by one or more monitoring systems associated with the one or more energy production or processing facilities overseen by system 10. In this exemplary embodiment, equipment monitoring system data 16 includes operational anomaly detection data associated with equipment of the one or more energy production or processing facilities and provided by one or more predictive anomaly detection systems associated with the equipment. Particularly, a predictive anomaly detection system associated with particular process equipment may detect an anomaly in the process equipment (e.g., a current or predicted failure or other issue requiring corrective action and pertaining to the process equipment) based on one or more sources of data, such as equipment sensor data 14, equipment maintenance data 18, etc.

Anomaly detection data provided by the one or more predictive anomaly detection systems which generate equipment monitoring system data 16 may comprise alerts of detected anomalies pertaining to process equipment of the one or more energy production or processing facilities. The alerts generated by the one or more predictive anomaly detection systems may be saved in collective data store 22. Additionally, the alerts generated by the one or more predictive anomaly detection systems of data source layer 12 may be eventually resolved by SMEs using system 10 to oversee the one or more energy production or processing facilities. Further, monitoring system data 16 may encompass data besides data generated by anomaly detection systems. For example, monitoring system data 16 may comprise data generated by a condition monitoring system, a predictive analytics system, one or more simulation models associated with the one or more energy production or processing facilities overseen by system 10, operating envelope anomaly or excursion, and/or plant deferral management systems. Anomalies may also be detected manually by operators of the one or more energy production or processing facilities where the manually detected anomaly may be entered into an anomaly detection or other system using a human-machine interface (HMI), As described above, in some embodiments, data source layer 12 includes additional plant- or facility-specific information belonging to contextual data sources of the contextual data class such as, for example, current operational status data. Additionally, in some embodiments, monitoring system data 16 may include historical data such as records of historical events such as prior process equipment anomalies and/or failures which may be drawn upon when evaluating analyzing current anomalies and/or other issues.

In this exemplary embodiment, equipment maintenance data 18 of data source layer 12 comprises maintenance records associated with equipment of the one or more energy production or processing facilities overseen by system 10.

For example, equipment maintenance data 18 may comprise all, or at least some, maintenance activities associated with the one or more energy production or processing facilities such as, for example, work orders, functional locations, inspections, corrective and preventive maintenance, repairs, and other measures previously taken to maintain equipment of the one or more energy production or processing facilities. Equipment maintenance data 18 may be captured from maintenance management software used to track maintenance activities for the one or more energy production or processing facilities such as, for example, Plant Maintenance (PM™) from SAP™ (http://www.sap.com). In this exemplary embodiment, records of at least some of the maintenance activities captured from the maintenance management software is stored in the collective data store 22. As described above, in addition to maintenance data provided by equipment maintenance data 18, data source layer 12 may also include equipment design data pertaining to the design and configuration of process equipment, and equipment status data pertaining to a current status of the process equipment (excluding sensor data which belongs to the separate sensor data class of data source layer 12).

P&IDs 20 of data source layer 12 comprise diagrams which map out and illustrate the operational configuration of equipment (including both mechanical and electrical equipment such as sensors, etc.) as well as the operational linkages between equipment of each of the one or more energy production or processing facilities overseen by system 10. P&IDs 20 thus illustrate the manner in which equipment of the energy production or processing facilities are interconnected, thus providing information about the relationship between each process equipment of a given energy production or processing facility. In this exemplary embodiment, P&IDs 20 are not stored in collective data store 22 and instead may be housed in a separate data store accessible by the data processing layer 30 of system 10; however, in other embodiments, P&IDs may also be stored in collective data store 22.

As will be discussed further herein, in this exemplary embodiment, data source layer 12 of system 10 includes a user interface (UI) output database 24 accessible by a user of system 10 to assist the user in overseeing or managing the one or more energy production or processing facilities overseen by system 10. In this exemplary embodiment, UI output database 24 is be stored separately from collective data store 22; however, in other embodiments, UI output database 24 may be stored within data store 22.

The data processing layer 30 of system 10 is generally configured to organize and process the information provided by data source layer 12 in a manner that assists a user (e.g., SMEs) of system 10 in providing support or managing one or more energy production or processing facilities. The automated organization, processing, and analysis of data performed by data processing layer 30 may reduce or eliminate the need for SMEs to manually score multiple sources of information (e.g., the data sources comprising data layer 12) when resolving alerts associated with the one or more energy production or processing facilities they oversee, thereby reducing the amount of time demanded from the SMEs when managing a given energy production or processing facility. In this exemplary embodiment, data processing layer 30 of system 10 generally includes a data handler 32, a data structure or graph model database 34, and a modeling system 36.

The data handler 32 of data processing layer 30 is generally configured to retrieve information from data source layer 12 in response to receiving a notification or alert, such as a query from a user of system 10, process, analyze, and perform analytics on the retrieved information, and provide an output or response to the user which addresses the query made by the user to system 10. In this exemplary embodiment, data handler 32 utilizes knowledge graph database 34 for determining the information data handler 32 must retrieve from data source layer 12 in order to address a given query from a user of system 10. In this exemplary embodiment, data handler 32 communicates with graph model database 34 through an application programming interface (API) 38. API 38 may allow data handler 32 to query graph model database 34 in response to receiving a notification. Graph model database 34 may store a data structure in the form of a graph model associated with each process equipment of each Energy production or processing facility overseen by system 10. In this exemplary embodiment, the data structures stored in graph model database 34 comprise knowledge graphs associated with the equipment of each Energy production or processing facility overseen by system 10. It may be understood that in other embodiments other types of data structures may be utilized instead of, or in addition to, knowledge graphs.

In some embodiments, the data handler 32 interrogates the knowledge graph database 34, and, based on the interrogation of the knowledge graph database 34, selects a subset of the data contained in the data source layer 12 identified by the data handler 32 as associated with a potential cause of an alert received by the data handler 32. In some embodiments, the selected subset of data sources includes both contextual data sources of the contextual data class and sensor data sources of the sensor data class, the contextual data sources including, among other things, equipment maintenance data 18, equipment design data, equipment status data, and/or current operating condition data associated with a current operational status of the one or more energy production or processing facilities. Additionally, in some embodiments, the data handler 32 statistically analyzes data sourced from the selected subset of data sources (including data sourced from both the contextual data sources and sensor data sources), and identifies the potential cause of the alert using the data source layer 12 and the statistical analysis performed by the data handler 32.

For example, the data handler 32 may reference, compare, correlate, and/or perform other operations on data sourced from the selected subset of data sources of data source layer 12. Specifically, data handler 32 may compare, associate, and/or correlate data from a first data source (e.g., sensor data) with data from a second data source (e.g., contextual data) of the plurality distinct data sources source using the data structure to determine an identity of the potential cause of the alert. The data handler 32 may also form new associations between different data sources of the data source layer 12 as part of this statistical analysis and which may be saved in the data source layer 12 to be drawn from at a later time. The data handler 32 may also recommend a corrective action to resolve the identified potential cause of the alert using the data source layer 12 and based on the statistical analysis performed by the data handler 32. Additionally, in some embodiments, data handler 32 recommends a particular corrective action from a range of distinct potential corrective actions to resolve the identified potential cause of the alert based on a severity of impact to the operation of the one or more energy production or processing facilities should a failure occur to the process equipment.

The knowledge graphs comprise a description of the equipment hierarchy of each energy production or processing facility overseen by system 10 while also defining a map linking or integrating various data sources to a given process equipment thereby illustrating the relationship between each data source and the given process equipment. Each knowledge graph signifies an object and an edge or connector which may connect a pair of objects (some edges may connect to only a single object) to thereby define a relationship between the pair of connected objects. Each object is associated with a relative piece of information pertaining to one or more pieces of equipment of a given energy production or processing facility. A single knowledge graph may contain information related to each process equipment of a given energy production or processing facility or there may be a plurality of knowledge graphs associated with different sections or units or even individual pieces of equipment of the energy production or processing facility.

Figure 2:
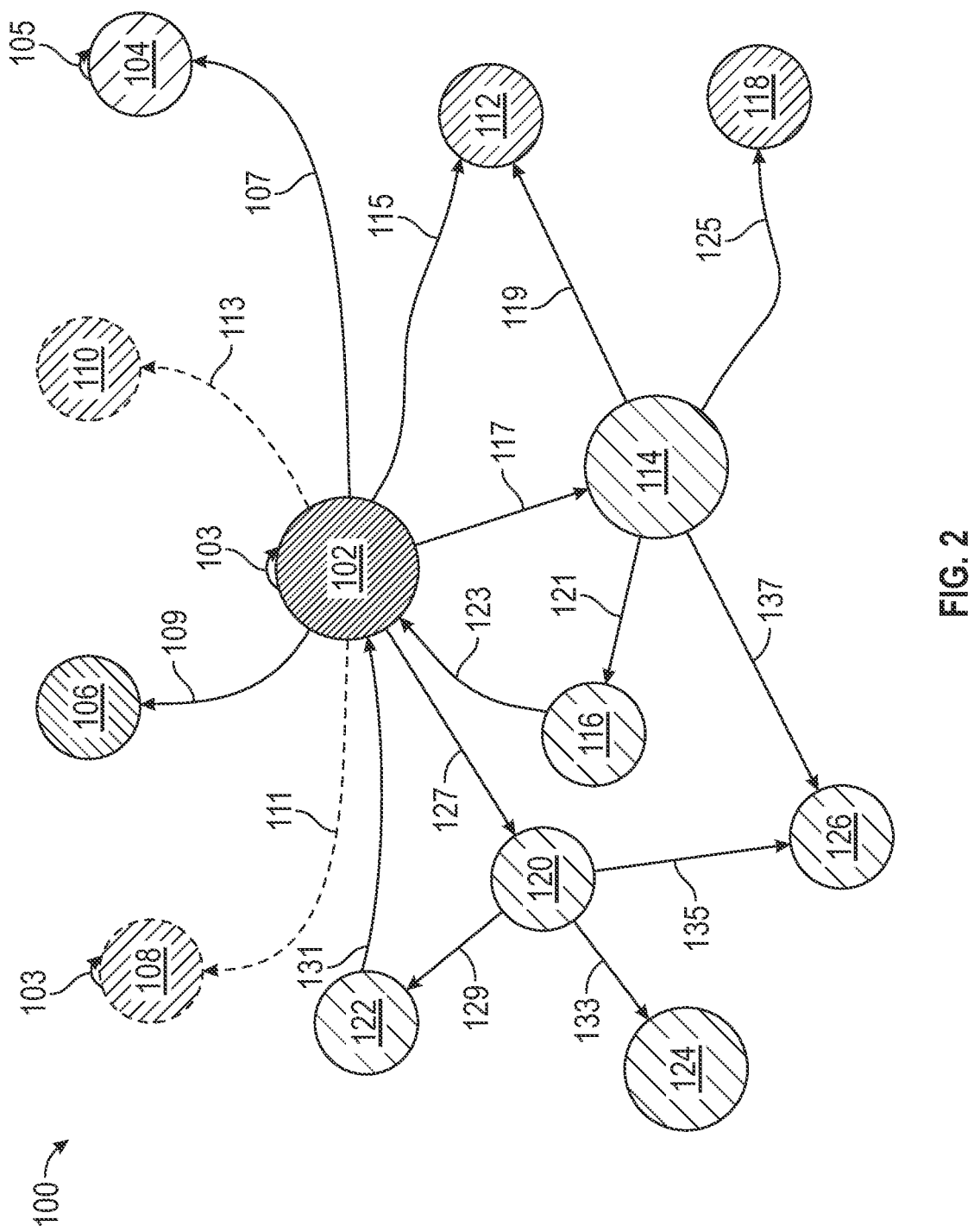
FIGS. 2, 3 are schematic views of graph models of process equipment of a hydrocarbon energy production or processing facility according to some embodiments.

Referring now to FIG. 2, an exemplary generic graph model 100 of process equipment of an energy production or processing facility is shown. In this exemplary embodiment, generic graph model 100 comprises a knowledge graph which generally includes a plurality of vertices or nodes indicated as circles in FIG. 1 and edges indicated as directional arrows. Particularly, in this exemplary embodiment, the nodes of generic graph model 100 include an equipment identifier node 102, a functional location node 104, a document node 106, a system node 108, a system tag node, 110, a model identifier node 112, a data stream node 114, a trip node 116, an anomaly identifier node 118, a failure mode 120, a historical event node 122, a recommended action node 124, and a symptom node 126. AI though only a single node of each type referenced above may be shown in the generic graph model 100 of FIG. 1, other graph models associated with one or more pieces of equipment may include a plurality of each node type.

Equipment identifier node 102 of generic graph model 100 represents an identity of a given process equipment of a hydrocarbon energy production or processing facility while functional location node 104 represents a functional location of process equipment (e.g., the equipment identified by equipment identifier node 102 in the example shown in FIG. 2). The functional location of process equipment may comprise a place where some maintenance work may be performed on the process equipment. In this exemplary embodiment, a component edge 103 is connected to only to the equipment identifier node 102 while a child edge 105 is connected to only the functional location node 104. The component edge 103 indicates that process equipment (equipment identifier node 102 in this exemplary embodiment) includes a child component that is itself a part of the process equipment (e.g., a sub-component or subassembly, for example, of the process equipment). The child edge 105 indicates a maintenance hierarchy between a parent process equipment (e.g., equipment identifier node 102) and a child component. Additionally, a functional location edge 107 extends between the equipment identifier node 102 and the functional location node 104 in this exemplary embodiment. The functional location edge 107 indicates where process equipment is related to a functional location.

Document node 106 of generic graph model 100 represents an external document. The external document identified by document node 106 may be linked or referenced by a uniform resource locator (URL) associated or contained by the document node 106. In this exemplary embodiment, the equipment identifier node 102 is connected to the document node 106 by a document edge 109. Document edge 109 indicates that a document (e.g., document node 106 shown in FIG. 2) describes process equipment (e.g., the process equipment associated with equipment identifier node 102) in some way.

System node 108 of generic graph model 100 represents a system of an energy production or processing facility while monitoring system node 110 represents a monitoring system (e.g., one of the monitoring systems associated with equipment monitoring system data 16 of the data layer 12) associated with the process equipment identified by node 102 In this exemplary embodiment, equipment identifier node 102 is connected to system node 108 by a system member edge 111 which indicates that the process equipment associated with the equipment identifier node 102 is a member of the system associated with system node 108. Additionally, monitoring system node 110 is connected to equipment identifier node 102 by a monitoring system edge 113 which indicates that the that the process equipment associated with the equipment identifier node 102 is monitored by the monitoring system represented by node 110.

The model identifier node 112 of generic graph model 100 represents the name or identity of an analytic model associated with process equipment and which may be activated to generate an alert (when an underlying cause is present) pertaining to the process equipment. Particularly, in this exemplary embodiment, model identifier node 112 is connected to equipment identifier node 102 by a model edge 115 indicating that the analytic model associated with node 112 may perform analysis on the process equipment associated with node 102. The analytic model associated with model identifier node 112 may comprise one of the monitoring systems associated with equipment monitoring system data 16 of the data layer 12 of system 10.

The data stream node 114 of generic graph 100 represents a specific data stream (e.g., a measurement data stream captured in equipment sensor data 14) by a sensor and that is associated with process equipment. In this exemplary embodiment, data stream node 114 is connected to equipment identifier node 102 by a measured data edge 117 indicating that a data stream associated with node 114 is being measured by equipment associated with node 102. The data stream associated with data stream node 114 may not itself be ingested into generic graph model 100 and instead the data stream node 114 may include a tag or identifier linking to equipment sensor data 14 of system 10 which may be stored in collective data store 22. Additionally, in this exemplary embodiment, data stream node 114 is connected to model identifier node 112 by a data model edge 119 which indicates that data stream associated with node 114 is used in an analytic model associated with node 114.

The trip node 116 of generic graph model 110 represents a condition that when identified in a measurement data stream (e.g., one of the measurement data streams comprising equipment sensor data 14) may cause an effect on process equipment. For example, a vibration measurement provided by a vibration sensor may result in the shutting down of a compressor associated with the vibration sensor. In this exemplary embodiment, data stream node 114 is connected to trip node 116 by a trip edge 121 which indicates that data stream associated with node 114 may cause a trip associated with trip node 116 to trigger. Additionally, trip node 116 is connected to equipment identifier node by a shutdown edge 123 which indicates that equipment associated with node 102 will be shut down in response to the occurrence of a trip associated with trip node 116.

The anomaly identifier node 118 of generic graph model 100 represents or identifies an anomaly in a stream of measurement data. An anomaly may comprise a predefined deviation from normal operating conditions. In this exemplary embodiment, data stream node 114 is connected to anomaly identifier node 118 by an anomaly edge 125 which indicates that data stream associated with node 114 will be recorded as an anomaly at the anomaly identifier node 118 should an anomaly occur.

The failure mode node 120 of generic graph model 100 represents or describes a failure condition that can possibly occur on a given process equipment. The failure modes described by failure mode nodes 120 of a given graph model may vary depending on the configuration of the particular process equipment to which the failure mode nodes 120 are associated. In this exemplary embodiment, equipment identifier node 102 is connected to failure mode node 120 by a failure edge 127 which indicates that a failure mode associated with node 120 may arise with respect to process equipment associated with node 102.

The historical event node 122 of generic graph model 100 represents an instance of a failure that has occurred in the past on particular process equipment. For example, historical event node 122 may catalog the occurrence of one of the failure modes described by failure mode nodes 120 associated with particular process equipment. In this exemplary embodiment, failure mode node 120 is connected to historical event node 122 by a prior event edge 129 which indicates which failure mode associated with node 120 occurred at node 122. Additionally, in this exemplary embodiment, historical event node 122 is connected to equipment identifier node 102 by a prior event identity edge 131 which indicates that equipment associated with node 102 is associated with a historical event associated with node 122.

The recommended action node 124 of generic graph model 100 represents a response or corrective action that may be taken to rectify failure condition occurring on process equipment. Particularly, the recommended action node 124 may represent a corrective action that may be taken to rectify a failure mode described at a failure mode node 120 associated with or connected to the recommended action node 124. In this exemplary embodiment, failure mode node 120 is connected to recommended action node 124 by an action edge 133 which indicates that a recommended action associated with node 124 may be taken to rectify a failure mode associated with node 120.

The symptom node 126 of generic graph model 100 represents a condition that might be observed when process equipment is in a given failure mode (e.g., a failure mode described by a failure mode node 120). In this exemplary embodiment, failure mode node 120 is connected to symptom node 126 by a symptom edge 135 which indicates that a symptom associated with node 126 can be observed when a failure mode associated with node 120 has occurred, Additionally, in this exemplary embodiment, data stream node 114 is connected to symptom node 126 by a diagnosis edge 137 which indicates that a symptom associated with symptom node 126 may be diagnosed by data stream associated with node 114.

Thus, generic graph model 100 integrates and interrelates each of the node types and edge types described above to form a wholistic picture of process equipment associated with equipment identifier node 102 in a manner which integrates a variety of distinct sources of information. Additionally, generic graph model 100 conveniently illustrates how each source of information relates to other sources of information in an intelligible manner. Graph models storable in graph model database 34 may include nodes and/or edges of types different than the nodes and edges described above with respect to generic graph model 100. For example, graph models may include sensor nodes and accompanying sensor tags, operational properties (e.g., running, stopped, in service, standby, out for maintenance, etc.) pertaining to particular pieces of equipment, plant or facility model nodes (e.g., three-dimensional (3D) plant models) associated with an energy production or processing facility, control system nodes associated with controls systems of the energy production or processing facility, and/or physical entity (e.g., cranes, lifeboats, or other equipment, etc.) of the energy production or processing facility.

Figure 3:
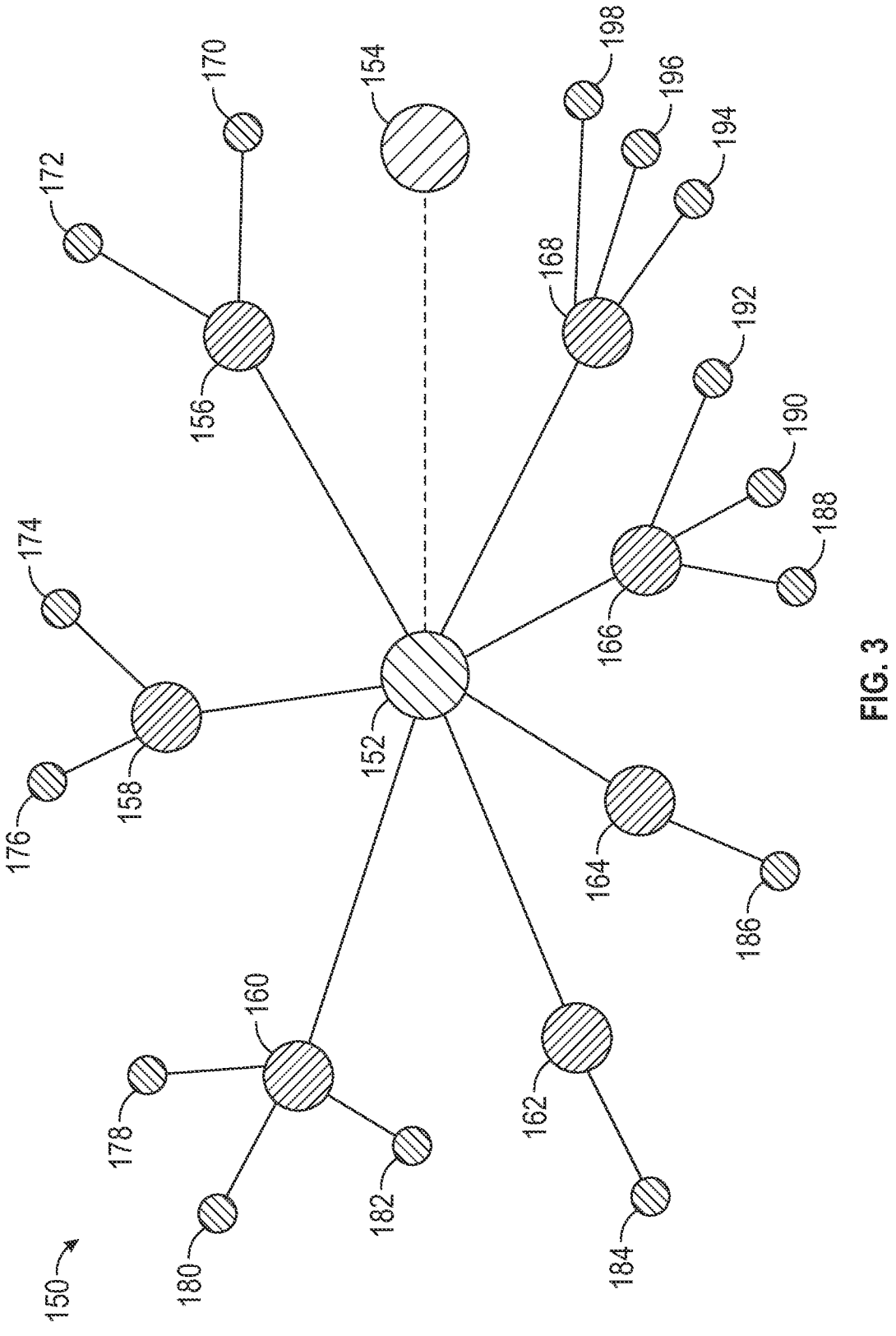

Referring now to FIG. 3, another exemplary graph model 150 of a given process equipment of a hydrocarbon energy production or processing facility is shown. In this exemplary embodiment, graph model 150 pertains to a first compressor of an energy production or processing facility that is associated with a first compressor node 152 of graph 150. In this exemplary embodiment, first compressor node 152 is connected to by an edge with a second compressor node 154 associated with a second compressor of the energy production or processing facility. In this exemplary embodiment, first compressor node 152 is also connected by edges to a maintenance data node 156, an engineering data node 158, a vibration system node 160, a model identifier node 162, a plant operation advisor (POA) node 164, a sensor identifier node 166, and a data stream node 168.

In this exemplary embodiment, maintenance data node 156 of graph model 150 is connected by edges to a material management node 170 and a maintenance records node 172. Nodes 170, 172 may include maintenance data pertaining to the compressor associated with first compressor node 152 which may be linked from nodes 170, 172 to the equipment maintenance data 18 of the data source layer 12 of system 10. In this exemplary embodiment, engineering data node 158 is connected by edges to a P&IDs node 174 and an equipment datasheet node 176. P&IDs node 174 may contain or link P&IDs including the first compressor while equipment datasheet node 176 may contain or link equipment datasheets associated with the first compressor. In some embodiments, P&IDs node 174 may link P&IDs comprising the first compressor from P&IDs 20 of the data source layer 12 of system 10.

In this exemplary embodiment, vibration system node 160 is connected by edges to a motor sensors node 178, coupling sensors node 180, and compressor sensors node 182. Nodes 178, 180, and 182 may identify sensors associated with a vibration system associated with vibration system node 160, the vibration system being associated with the first compressor. In this exemplary embodiment, model identifier node 162 identifies a predictive anomalies model associated with the first compressor and which is connected by an edge to an alerts node 184 which identifies alerts generated by the predictive anomalies model associated with node 162 and the first compressor. In this exemplary embodiment, POA node 164 represents a system containing operating envelope anomalies and case management data and thus represents a set of analytics associated with anomaly node 186. POA node 164 is connected by an edge to an anomalies node 186 which identifies anomalies in data associated with a POA of POA node 164.

In this exemplary embodiment, sensor identifier node 166 is connected by edges to a pressure sensor identifier node 188, a gas flow rate sensor identifier node 190, and a temperature sensor identifier node 192. Nodes 188, 190, and 192 identify specific sensors associated with the first compressor. In this exemplary embodiment, data stream 168 is connected by edges to a pressure data stream node 194, a gas flow rate data stream node 196, and a temperature data stream node 198. The data streams associated with nodes 194, 196, and 198 may be linked from nodes 194, 196, and 198 to the collective data store 22 which stores real-time data provided by equipment sensor data 14 of data source layer 12.

Referring again to FIG. 1, data handler 32 leverages the organization provided the graph models stored in graph model database 34 to identify which information provided by data source layer 12 is associated with a notification received by the data handler 32, such as a equerry submitted by a user of system 10. For example, data handler 32 may select a subset of the data sources (including both contextual data sources belonging to the contextual data class and sensor data sources belonging to the sensor data class) stored in graph model database 34 relevant to resolving a notification received by the data handler 32, such as a query submitted by a user of system 10. Having identified which information is relevant to resolving a given notification, data handler 32 may also utilize the graph models stored in graph model database 34 to access desired information provided by data source layer 12 given that the graph models link to data provided by data source layer 12, Thus, the graph models stored in graph model database 34 organize the data provided by data source layer 12 in a manner such that data handler 32 may efficiently identify all pertinent data related to resolving a given notification and to efficiently access said relevant data without needing to query collective data store 22 directly.

In addition to identifying and retrieving data sourced from the subset of data sources identified as pertinent to resolving a notification received by data handler 32, data handler 32 is also configured to statistically analyze the retrieved data in order to resolve the notification as well as to provide continually updated situational awareness of abnormal patterns and operational context with respect to the one or more energy production or processing facilities overseen by system 10 to users of system 10. Particularly, data handler 32 may systematically analyze data retrieved from data source layer 12 using the graph models stored in graph model database 34 in order to automate analyses that would otherwise be done manually by SMEs, thereby maximizing the SMEs' efficiency in resolving alerts or performing other tasks when using system 10. In this manner, data handler 32 may to an extent codify and systematize the engineering judgement and knowhow employed by SMEs when traditionally performing their tasks in a manner that is largely automated and consistent. The analysis performed by data handler 32 may provide insights, recommendations, and suggested prioritizations of tasks to users of system 10.

Data handler 32 may be configured to perform various types of statistical analysis on data retrieved from data source layer 12 to identify a potential cause of an alert received by the data handler. For instance, in this exemplary embodiment, data handler 32 is configured to perform core compressor analytics, root cause analytics, cause & effect (C&E) analytics, predictive anomaly detection analysis, anomaly analysis and recommendation, system level analytics, and/or fleet history analytics (e.g., the fleet of energy production or processing facilities overseen by system 10). The Core compressor analytics performed by data handler 32 may include comparing current average values for real-time data streams (e.g., pressure, temperature, flowrate, vibration, etc., data streams provided by equipment sensor data 14 of data source layer 12) against corresponding average values calculated from predefined historical periods (e.g., the corresponding average values for the previous month, etc.). Core compressor analytics performed by data handler 32 may also account for how many maintenance actions (e.g., work orders) are completed for process equipment for a predefined time period (e.g., over the preceding six months, for example) via accessing the maintenance data 18 of data source layer 12. In this manner, data handler 32 may provide situational awareness to a user of system 10 by determining whether process equipment is behaving as expected on previous trends or if an anomaly pertaining to the process equipment has occurred.

The root cause analytics performed by data handler 32 may include investigating an alert (e.g., alerts associated with equipment monitoring system data 16 of data source layer 12 provided by one or more predictive anomaly detection systems) received by data handler 32 to determine a potential failure mode underlying the received alert. C&E analytics performed by data handler 32 may include analyzing trips and shut downs of pieces of equipment overseen by the system 10 to assist in analyzing potential impacts to production associated with the trip or shut down. For instance, C&E analytics performed by data handler 32 may determine the potential future tripping of a compressor indicated by an increasingly high-pressure transmitter reading may result in a quantified amount of loss of production (e.g., a number of barrels of hydrocarbons that are lost from production). Predictive anomaly detection analysis provided by data handler 32 may include triaging alerts (associated with equipment monitoring system data 16) provided by predictive anomaly detection systems. Particularly, data handler 32 may triage received alerts based on potential operational impacts pertaining to each received alert. Data handler 32 may also recommend potential responses for addressing each received alert based on information provided by the graph models stored in graph model database 34.

The anomaly analysis performed by data handler 32 may include assisting a user of system 10 in determining why a prior anomaly for process equipment occurred. Data handler 32 may determine why a prior anomaly occurred using information provided by the graph models stored in graph model database 34. Data handler 32 may also analyze anomaly historical data (e.g., stored in collective data store 22 and retrievable via the graph models stored in graph model database 34) to provide recommendations for avoiding anomalies in the future. The system level analytics performed by data handler 32 may include performing analysis on a system or facility level rather than on particular process equipment of an energy production or processing facility. For example, data handler 32, relying on information provided by the graph models stored in graph model database 34, may perform system level analytics to determine if a received alert is due to the configuration of systems upstream and/or downstream from the particular process equipment associated with received alert. Fleet history analytics performed by data handler 32 may include, upon receiving an alert pertaining to particular process equipment, analyzing historical data of a fleet (e.g., a fleet comprising one or more energy production or processing facilities) to identify similar cases (e.g., cases having similar symptoms as the current alert) that have occurred in the past and identify potential failure modes based on the identified similar cases.

At least some of the analysis performed by data handler 32 may utilize models created through artificial intelligence (AI) techniques, such as machine learning (ML) techniques. In this exemplary embodiment, modeling system 36 may be employed by data handler 32 to implement AI techniques, such as ML techniques, to create models which may be utilized by data handler 32 when responding to a notification. For example, data handler 32 may feed modeling system 36 with selected data retrieved from data source layer 12 via the graph models stored in graph model database 34 in order to train and/or test a model (e.g., a model of particular process equipment, a model of a system of an energy production or processing facility, etc.) created by modeling system 36. Modeling system 36 may process the data provided by data handler 32 to create the desired model which may then be utilized by data handler 32.

In this exemplary embodiment, at least some of the outputs of data handler 32 such as, for example, analyses, actionable insights, recommendations, lessons learned, etc., are stored in UI output database 24 of data source layer 12. The outputs stored in UT output database 24 may be accessed by a user of system 10 as will be described further herein. In other embodiments, outputs of data handler 32 may be stored in collective data store 22, locally by the user of system 10, as well as other locations accessible by the user.

The visualization layer 50 of system 10 allows one or more users to access and interact with system 10 whereby the one or more users may be assisted by system 10 in overseeing the energy production or processing facilities they have been tasked with managing. In this exemplary embodiment, visualization layer 50 comprises a first UI 52 and a second UI 60. Each UI 52, 60 includes a visual display 54, 62, respectively, and an input device 56, 64, respectively. Each UI 52, 60 may also comprise a computer system including a memory device and a processor configured to execute machine readable instructions storable on the memory device. Display devices 54, 62 may each comprise a monitor, a touch screen, and/or other components configured to display information visually to a user of system 10. Display devices 54, 62 each provide a graphical UI for interacting with features of system 16. Input devices 56, 64 may comprise a keyboard, mouse, and/or other devices with which a user of system 10 may interact.

Figure 4:
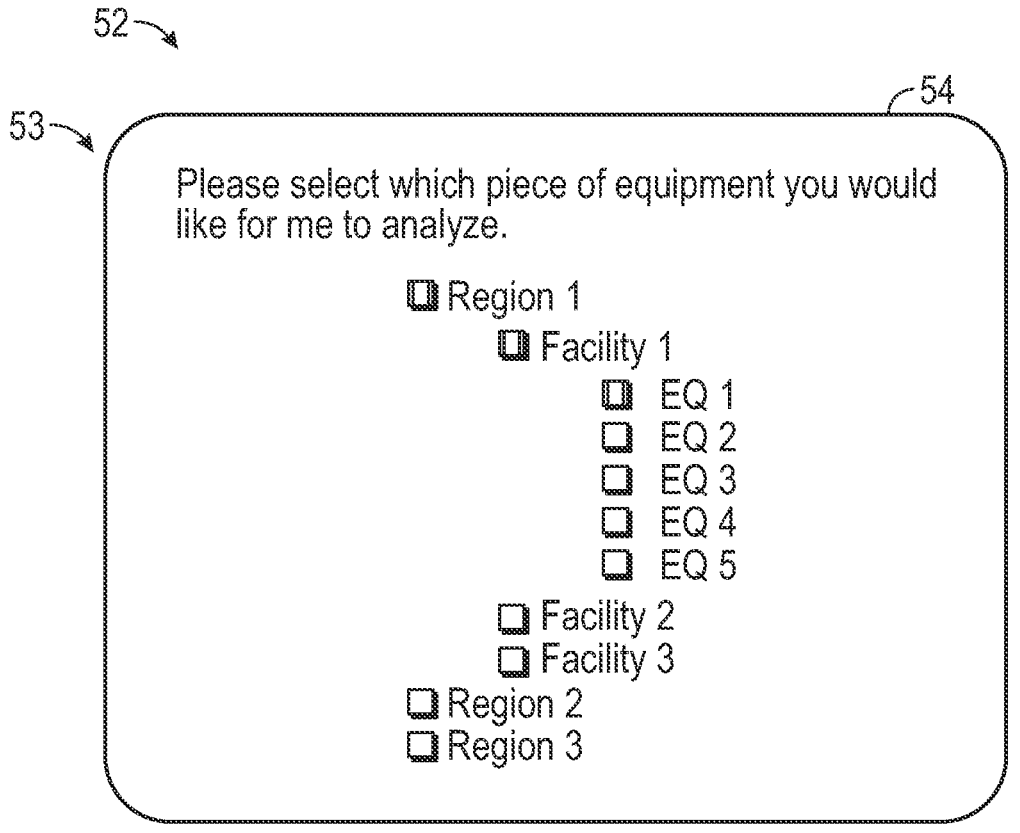

First UI 52 may comprise a primary UI through which users may access system 10 while second UI 60 may be used by users to access and interact with the graph models stored in graph model database 34 of data processing layer 30. Particularly, users of system 10 may direct queries or other notifications to the data handler 32 of data processing layer 30. For example, referring to FIGS. 4-7, exemplary graphics or screenshots 53, 55, 57, and 59, respectively, displayable on the display device 54 of first UI 52 are shown. In this exemplary embodiment, a user may select a region, an energy production or processing facility of the selected region, and process equipment of the selected energy production or processing facility using first UI 52 (indicated in graphic 53 of FIG. 4). In response, data handler 32 may gather and analyze information that may then be displayed on display device 54 of first UI 52 and which is pertinent to the selected process equipment (indicated as "EQ1" in FIGS. 4-7) to provide the user with situational awareness and operational context regarding the selected equipment.

In this exemplary embodiment, graphic 55 of FIG. 5 may comprise a situational awareness graph 55 and may indicate an overall view of the selected equipment. For example, an equipment triage (indicated by arrow 70 in situational awareness graphic 55) pertaining to the selected equipment may be displayed on first UI 52 and which indicates recently captured measured data of the selected equipment (e.g., vibration, inlet temperature, outlet temperature, flowrate, etc.) compared with historical trends. An overall status (indicated by arrow 71 in situational awareness graphic 55)

of the process equipment may also be displayed and which indicates average values for selected parameters of the process equipment.

Additionally, maintenance data (e.g., retrieved from equipment maintenance data 18 of data source layer 12 via the graph models stored in graph model database 34) pertaining to the selected equipment may be displayed (indicated by arrow 72 in situational awareness graphic 55). The displayed maintenance data may include a work order number, a functional location at which the maintenance associated with the work order number took place, a start date associated with the work order number, a description of the work order, and a status of the work order. Alerts (e.g., retrieved from the equipment monitoring system data 16 of data source layer 12) pertaining to the equipment may be displayed (indicated by arrow 73 in situational awareness graphic 55). Particularly, the displayed alerts may include a monitoring system identity, an alert identity associated with the monitoring system identity, a start time of the alert identity, an end time of the alert identity, and a disposition (e.g., describing the type of event, if maintenance is required, etc.) of the alert identity.

Further, known vulnerabilities (indicated by arrow 74 in situational awareness graphic 55) associated with the selected equipment or energy production or processing facility may also be displayed. Known vulnerabilities may include previous or existing failures of the selected equipment, equipment similar in configuration to the selected equipment, or energy production or processing facility operational weaknesses and may be gleaned by data handler 32 from the graph models stored in graph model database 34. Additional information may also be displayed on situational awareness graphic 55 or graphics associates with graphic 55 (e.g., graphics that are linked to or clickable through graphic 55). For example, a graph model pertaining to the selected equipment may be displayed on situational awareness graphic 55. Additionally, P&IDs, links to relevant external documents, and a summary of the function of the selected equipment may also be displayed on situational awareness graphic 55.

Figure 6:
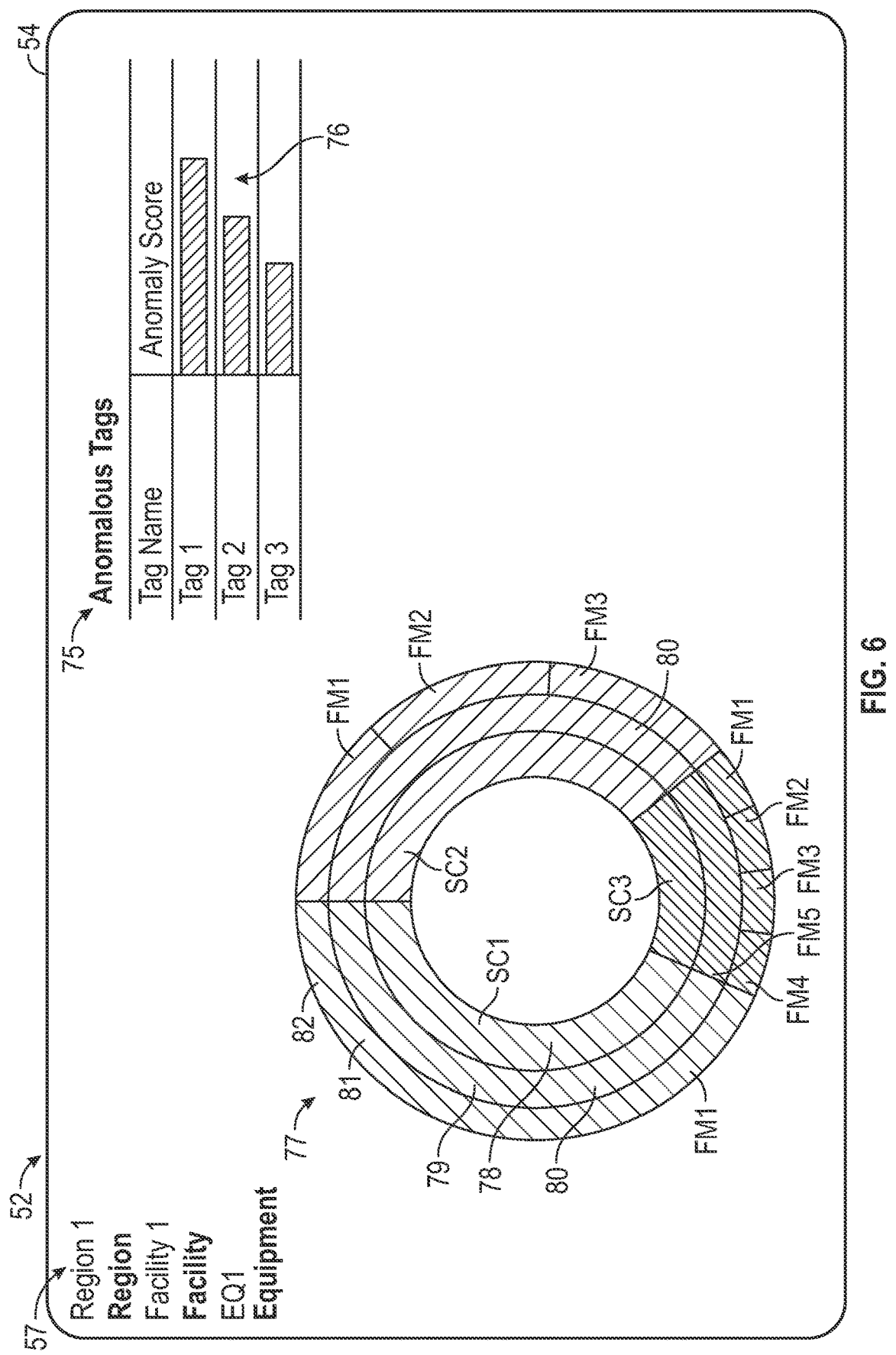
Figure 7:
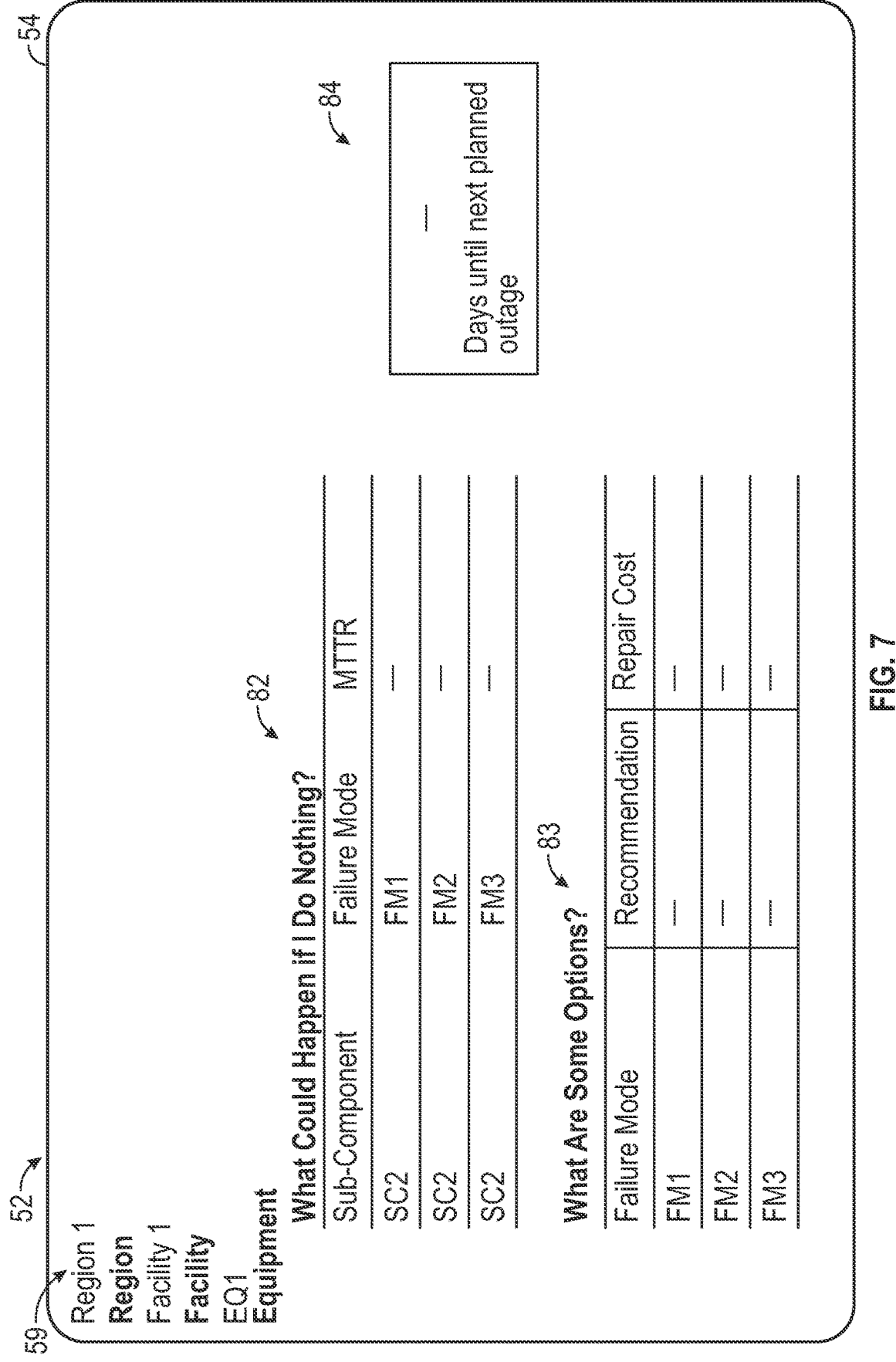

In this exemplary embodiment, the user may select on one of the alert identities shown on situational awareness graphic 55 to display graphic 57 (shown in FIG. 6) on the display device 54 of first UI 52. Graphic 57 may display information pertaining to potential underlying causes which may explain the alert associated with the given alert identity. The graphic 57 shown in FIG. 6 is one example of the types of information that may be displayed. Particularly, graphic 57 illustrates a list of anomalous tags (indicated by arrow 75 in graphic 57). Each of the anomalous tags listed on graphic 57 pertains to a specific data stream (e.g., a specific data stream node 114 connected to an equipment identifier node associated with the selected equipment) captured by a given sensor associated with the selected equipment. Thus, a given alert may correspond to a plurality of data streams provided by a plurality of sensors. Additionally, each anomalous tag may be scored (indicated by arrow 76 in graph 57) based on the degree of anomaly associated with the anomalous tag. The anomaly score of each anomalous tag may correspond to which the current or recently captured measurements of the data stream associated with anomalous tag deviates from historical measurements of the data stream. This information may be determined by data handler 32 as part of the core compressor analytics performed by handler 32. Thus, the user upon viewing graphic 57 may readily identify which particular anomalous tags associated with a specific alert have the highest degree of deviation with respect to their historical values.

In this exemplary embodiment, graphic 57 also illustrates a doughnut chart (indicated by arrow 77 in graphic 57) which includes an inner ring 78 indicating sub-components (shown as sub-components SC1, SC2, and SC3 in graphic 57) most likely to fail based on the anomaly scores of the anomalous tags associated with the selected alert. The sub-components of selected equipment EQ1 may also be referred to herein as pieces of equipment associated with selected equipment EQ1. The circumferential length of each sub-component about inner ring 78 indicates the relative likelihood of failure for each sub-component. In other words, the larger the circumferential length of a given sub-component about inner ring 78, the more likely the underlying cause associated with the selected alert is due to the given sub-component. In the example illustrated in graphic 57, the selected alert is most likely caused by an issue pertaining to sub-component SC1. The second most likely culprit in this example is sub-component SC2; and sub-component SC3 is the least likely culprit of sub-components SC1, SC2, and SC3.

The doughnut chart 77 of graphic 57 also includes a central or middle ring 79 which includes potential symptoms 80 (e.g., high vibration, high temperature, etc.) associated with each sub-component and which are possible based on the anomaly scores of the anomalous tags associated with the selected alert. Further, doughnut chart 77 of graphic 57 includes an outer ring 81 which includes potential failure modes (indicated as failure modes FM1, FM2, FM3, etc., for each sub-component SC1, SC2, and SC3) associated with each sub-component and which are possible based on the anomaly scores of the anomalous tags associated with the selected alert. As shown in graphic 57, a potential failure of a given sub-component may arise through one or more potential failure modes. The relationships between the sub-components, symptoms, and failure modes indicated in doughnut chart 77 for a given alert may be determined by data handler 32 based on analytics performed by handler 32 (e.g., fleet history analytics, etc.) and by the relational information contained in the graph models stored in graph model database 34.

The user may select one of sub-components SC1, SC2, and SC3 shown in the doughnut chart 77 of graphic 57 to produce graphic 59 which indicates the severity of impact to the operation of the process equipment and/or to the energy production or processing facility comprising the process equipment should one of the potential failure modes associated with the sub-component occur. In this exemplary embodiment, graphic 59 illustrates what could happen if no action were taken (indicated by arrow 82 in graphic 59) and each potential failure mode (e.g., failure modes FM1, FM2, and FM3) associated with sub-component SC2 were allowed to occur. Particularly, an impact, such as an operational impact, resulting from each failure mode is indicated by deferral mean time to recover (MTTR) which may be measured in units of thousands of barrels of oil equivalent. The MTTR may refer to the MTTR for the process equipment (equipment EQ1 in this example) should a given failure mode occur. The MTTR for each given failure mode for each sub-component may be determined by data handler 32 through the performance of analytics on the data provided by data source layer 12 and retrieved using the graph models stored in graph model database 34.

In this exemplary embodiment, graphic 59 also indicates options for addressing each failure mode (indicated by arrow

83 in graphic 59) associated with a selected sub-component. Particularly, a suggested recommendation or corrective action (e.g., replacing equipment, inspecting equipment, refurbishing equipment, etc.) for addressing each specific failure mode along with a cost associated with the suggested recommendation may be indicated. Additionally, in this exemplary embodiment, graphic 59 may identify whether each recommendation may be performed with the selected process equipment online or whether the process equipment must be shut down in order for the recommendation to be performed. Further, the amount of time until the next planned outage for the selected equipment (indicated by arrow 84 in graphic 59) is also shown to provide context as to when the recommendations which require the shutdown of the process equipment could be performed.

The operational impact associated with each failure mode along with the cost associated with each recommendation and the amount of time until the next planned outage for the selected equipment may guide the user of system 10 in selecting an appropriate action for resolving the selected alert in a manner that balances costs against the risk of an extended MTTR for the selected equipment. The information shown in graphic 59 and indicated by arrows 82, 83, and 84 may also be provided by data handler 32 using the graph models stored in graph model database 34 and the data sourced from data source layer 12.

Information in addition to that contained in graphics 53, 55, 57, and 59 described above may be accessible to users of system 10 through first UI 52. Additionally, in some embodiments, information contained in graphics 53, 55, 57, and 59 may be stored in UI database 24 where it may then be accessed by the user of system 10 through first UI 52.

The second UI 60 of system 10 may be used to directly access the graph models stores in graph model database 34 of data processing layer 30. In this exemplary embodiment, second UI 60 is connected to graph model database 34 through a model search service or engine 40. Search engine 40 indexes the graph models stored in database 34 such that a user of system 10 may conveniently locate and access a desired graph model stored in graph model database 34. Upon accessing the desired graph model, the user may display the graph model on the display device 62 of second UI 60. Additionally, the user may edit the accessed graph model using the input device 64. In some embodiments, users of system 10 may edit graph models stored in graph model database 34 to reflect changes to the one or more energy production or processing facilities overseen by system 10; however, in other embodiments, the revising of graph models stored in graph model database 34 may be performed in at least a partially automated manner using data handler 32. In some embodiments, the graph models stored in graph model database 34 may be created semi-manually by SMEs; however, in other embodiments, creation and updating of the graph models stored in graph model database 34 may be automated using AI techniques.

Figures 8, 9:
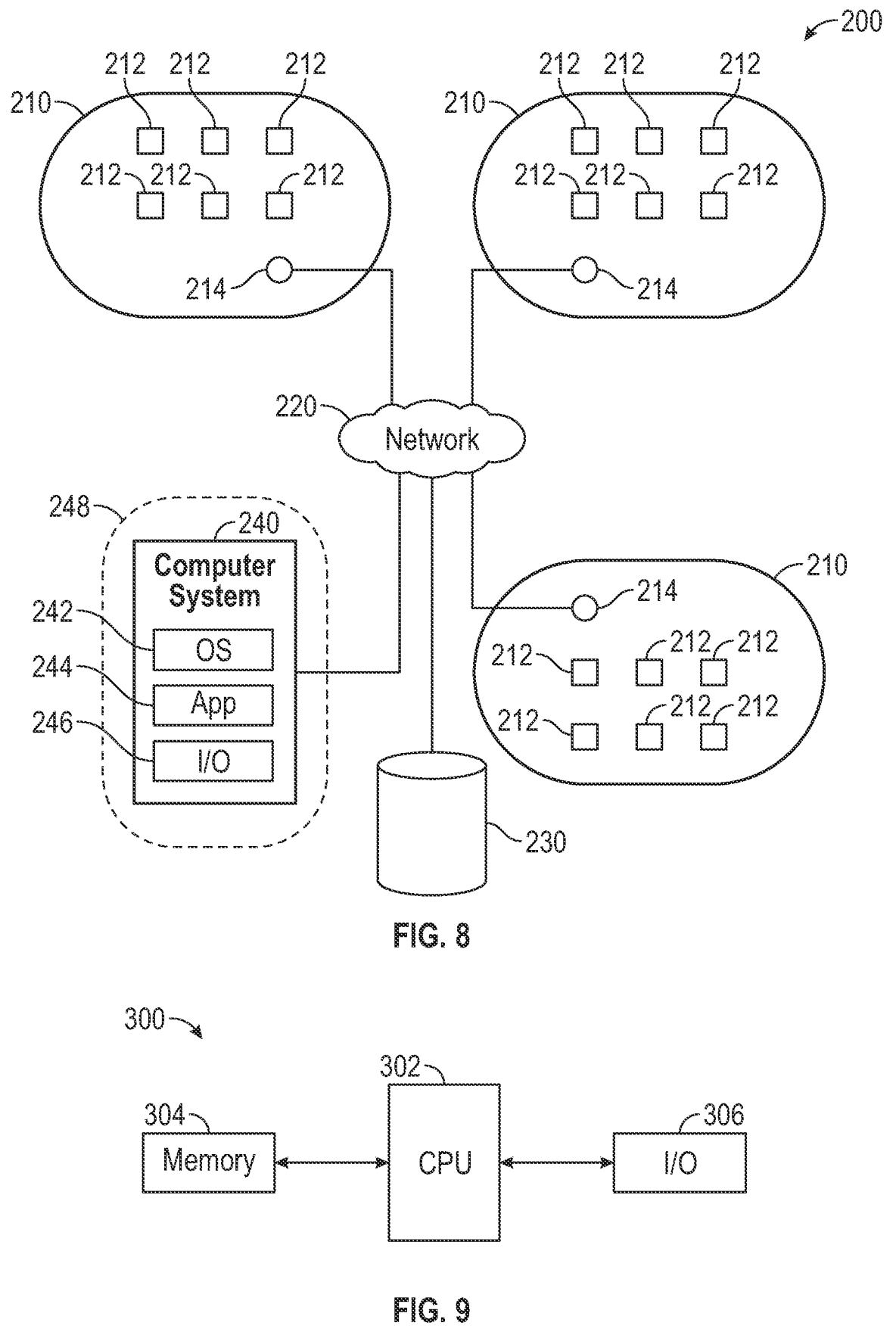

Referring to FIG. 8, an embodiment of a system 200 for overseeing or facilitating the management of one or more hydrocarbon energy production or processing facilities is shown. System 200 may include features in common with system 10 shown in FIG. 1. For instance, system 200 may incorporate the architecture of system 10 shown in FIG. 1. In this exemplary embodiment, system 200 generally includes a plurality of hydrocarbon Energy production or processing facilities 210, a network 220, a data store 230, and a computer system 240.

The Energy production or processing facilities 210 of system 200 in this exemplary embodiment each include process equipment 212 and a local monitoring system 214. The process equipment 212 of each Energy production or processing facility 210 may comprise stationary equipment (e.g., vessels, pipelines, heat exchangers, etc.), rotating equipment (e.g., pumps, compressors, etc.), sensors (e.g., pressure sensors, temperature sensors, vibration sensors, etc.) as well as other types of equipment which may be capturable in a P&ID, such as in the P&IDs 20 of the data source layer 12 of system 10. The monitoring system 214 of each Energy production or processing facility captures measurement data streams in real-time provided by the sensors of the Energy production or processing facility. The data streams captured by monitoring systems 214 may correspond to the equipment sensor data 14 of the data source layer 12 of system 10.

The monitoring system 214 of each Energy production or processing facility 210 is be communicatively coupled with the data store 230 and computer system 240 via network 220. The network 220 of system 200 may comprise one or more public networks, one or more private networks, or a combination thereof. While shown as communicatively coupled to the network 220, data store 230 and computer system 240 may be considered part of network 220 and are illustrated as separate from network 220 in FIG. 8 to promote discussing their roles with respect to Energy production or processing facilities 210.

Data store 230 may comprise a repository of collected data pertaining to Energy production or processing facilities 210. Data store 230 is communicatively coupled to the network 220 and receives data from the monitoring systems 214 of Energy production or processing facilities 210. In some embodiments, data store 230 comprises one or more of equipment maintenance data 18, P&IDs 20, collective data store 22, UI output database 24, and graph model database 34. In other embodiments, equipment maintenance data 18, P&IDs 20, collective data store 22, UI output database 24, and/or graph model database 34 may be stored in a variety of locations, including in a memory of computer system 240.

Computer system 240 generally includes an operating system (OS) 242, an application 244 executing on the OS 242, and an input/output (I/O) device 246. In this exemplary embodiment, computer system 240 comprises a personal computing device, such as a desktop, laptop computer, tablet, smart phone, etc., which is directly accessible by a user of system 200 and is communicatively coupled with data store 230 and Energy production or processing facilities 210 through network 220. In this exemplary embodiment, the I/O device 246 of computer system 240 comprises a display device similar in configuration to display device 54 of first UI 52 shown in FIG. 1 and an input device similar in configuration to input device 56 of first UI 52. Additionally, the computer system 240 is physically located at a central command station 248 which may be distal each of the Energy production or processing facilities 210. However, in other embodiments, computer system 240 may comprise a server of network 220 which may be accessed by a user of system 200 through a personal computing device of the user which is communicatively coupled to computer system 240 via network 220. In still other embodiments, computer system 240 may comprise one or more virtual servers in a cloud computing environment.

In this exemplary embodiment, application 244 comprises or is configured to invoke one or more of the features of system 10 shown in FIG. 1, For example, application 244 may comprise or be configured to invoke data handler 32 of the data processing layer 30 of system 10 to retrieve and/or analyze data provided by the data source layer 12 of system 10 as described in greater detail above. Thus, data handler 32 of system 10 may execute upon computer system 240. A user of computer system 240 may thus invoke data handler 32 through the execution of application 244 in order to obtain information and recommendations from data handler 32, such as the information contained in graphics 53, 55, 57, and 59 shown in FIGS. 4-7. Application 244 may also comprise or be configured to invoke the modeling system 36, the API 38, and/or the search engine 40 of data processing layer 30 of system 10. In addition, application 244 may comprise or be configured to invoke UI output database 24 of data source layer 12.

Referring to FIG. 9, an embodiment of a computer system 300 suitable for implementing one or more embodiments disclosed herein is shown. For example, components of the system 200 (e.g., computer system 240, etc.) shown in FIG. 8 may be configured in a manner similar to the computer system 300 shown in FIG. 9. The computer system 300 includes a processor 302 (which may be referred to as a central processor unit or CPU) that is in communication with one or more memory devices 304, and input/output (I/O) devices 306. The processor 302 may be implemented as one or more CPU chips. The memory devices 304 of computer system 300 may include secondary storage (e.g., one or more disk drives, etc.), a non-volatile memory device such as read only memory (ROM), and a volatile memory device such as random access memory (RAM). In some contexts, the secondary storage ROM 306, and/or RAM comprising the memory devices 304 of computer system 300 may be referred to as a non-transitory computer readable medium or a computer readable storage media. I/O devices 306 may include printers, video monitors, liquid crystal displays (LCDs), touch screen displays, keyboards, keypads, switches, dials, mice, and/or other well-known input devices. Although shown as including a single CPU 302, a single memory device 304, and a single I/O device 306 in FIG. 9, it may be understood that computer system 300 may include a plurality of separate CPUs 302, memory devices 304, and I/O devices 306. It may also be understood that computer system 300 may be embodied in a networked computing system such as a cloud computing environment in which, for example, components of system 200 are executed and/or stored in the cloud rather than locally on a single computer.

It is understood that by programming and/or loading executable instructions onto the computer system 300, at least one of the CPU 302, the memory devices 304 are changed, transforming the computer system 300 in part into a particular machine or apparatus having the novel functionality taught by the present disclosure. Additionally, after the computer system 300 is turned on or booted, the CPU 302 may execute a computer program or application. For example, the CPU 302 may execute software or firmware stored in the memory devices 304. The software stored in the memory devices 304 and executed by CPU 302 may comprise features of system 10 shown in FIG. 1, including, for example, data handler 32 of the data processing layer 30 of system 10. During execution, an application may load instructions into the CPU 302, for example load some of the instructions of the application into a cache of the CPU 302. In some contexts, an application that is executed may be said to configure the CPU 302 to do something, e.g., to configure the CPU 302 to perform the function or functions promoted by the subject application. Wien the CPU 302 is configured in this way by the application, the CPU 302 becomes a specific purpose computer or a specific purpose machine.

Referring to FIG. 10, a method 350 for facilitating the management of one or more Energy production or processing facilities is shown. In some embodiments, one or more of the steps of method 350 may be implemented using the computer system 240 of the system 200 shown in FIG. 8. Additionally, one or more of the steps of method 350 may be implemented using the architecture (e.g., data source layer 10, data processing layer 30, and/or visualization layer 50) of the system 10 shown in FIG. 1. In this exemplary embodiment, method 350 begins at block 352 in which a notification is received pertaining to process equipment of an energy production or processing facility. In some embodiments, block 352 comprises receiving an alert associated with the process equipment of an energy production or processing facility (e.g., process equipment 212 of one of the Energy production or processing facilities 210 of system 200 shown in FIG. 8). The alert may correspond to an anomaly in the operation of the process equipment. For example, the alert may comprise equipment monitoring system data 16 of data source layer 12 (shown in FIG. 1) and may be generated by one or more equipment monitoring systems (e.g., one of the monitoring systems 214 of system 200 shown in FIG. 8).

In other embodiments, the notification of block 352 may comprise a request from a user to access information pertaining to the one or more pieces of equipment. For example, the notification may correspond or be generated in response to a user selecting process equipment of a selected Energy production or processing facility (e.g., the selection of equipment EQ1 in the graphic 53 shown in FIG. 4, for example). Thus, the notification of block 352 may be generated automatically (e.g., via a monitoring system) or in response to the action of a user of a system for facilitating the management of one or more Energy production or processing facilities (e.g., systems 10, 200 shown in FIGS. 1, 8, respectively).

Block 354 of method 350 includes providing operational context with respect to the one or more pieces of equipment based on a plurality of distinct data sources. It may be understood that in some embodiments, method 350 may not include block 354. In some embodiments, block 354 comprises providing information to a user pertaining to the one or more pieces of equipment based on the plurality of distinct data sources. For instance, information may be provided to the user pertaining to process equipment in response to the user requesting information pertaining to the process equipment. The plurality of distinct data sources on which the provided operational context is based may comprise, for example, graph models (e.g., the graph models stored in graph model database 34 of the system 10 shown in FIG. 1) equipment sensor data (e.g., equipment sensor data 14 of the system 10), equipment monitoring system data (e.g., monitoring system data 16 of system 10), equipment maintenance data (e.g., equipment maintenance data 18 of system 10), P&IDs (e.g., P&IDs 20 of system 10), engineering data, FMECA data, safety studies data, daily logs, case management data, lessons learned data, planning and scheduling data, and/or equipment materials data.

In some embodiments, the operational context provided at block 354 includes an overall, current status of a selected process equipment. This information may include a graph model of the selected process equipment (e.g., a graph model similar in configuration to graph models 100, 150 shown in FIGS. 2, 3), recently captured measured data of the selected equipment (e.g., vibration, inlet temperature, outlet temperature, flowrate, etc.) compared with historical trends, current average values for one or more parameters pertaining to the process equipment, maintenance data (e.g., work orders and descriptions thereof), P&IDs containing the selected process equipment, a description of the selected process equipment, and/or alerts (e.g., including the information contained in graphic 55 shown in FIG. 5) which may be generated by an equipment monitoring system in response to the identification of one or more anomalies in the data analyzed by the monitoring system.

Block 356 of method 350 includes interrogating by a data handler data structure linking together and organizing a plurality of distinct data sources. In some embodiments, block 356 includes interrogating by the data handler 32 shown in FIG. 1 the graph model database 34 which links together and organizes the plurality of distinct data sources of the data source layer 12. As described above, in some embodiments, the data comprising data source layer 12 includes both sensor data sources belonging to a sensor data class and contextual data sources belonging to a contextual data class which excludes the sensor data sources of the sensor data class.

Block 358 of method 350 includes selecting a subset of data from the plurality of distinct data sources, including both contextual data sources and sensor data sources, identified by the data handler as associated with a potential cause of the alert based on the interrogation of the data structure. In some embodiments, block 358 includes selecting a subset of data sources from the contextual data class and the sensor data class of the data source layer 12 shown in FIG. 1, the selected subset of data sources being identified by the data handler 32 as associated with a potential cause of the alert. For example, the data handler 32 may leverage the linkages and organization provided by the data structure (e.g., graph model database 34) to determine which data may be used to determine an identity of the potential cause once the selected subset of data has been analyzed by the data handler 34.

Block 360 of method 350 includes statistically analyzing by the data handler data sourced from the selected subset of data sources. In some embodiments, block 360 includes statistically analyzing by the data handler 32 data sourced from the selected subset of data sources of the data source layer 12 shown in FIG. 1 including contextual data sources and sensor data sources. For example, compare, associate, and/or correlate data from a first data source (e.g., a sensor data) with data from a second data source (e.g., a contextual data source) of the plurality distinct data sources.

Block 362 of method 350 includes identifying by the data handler the potential underlying causes based on the statistical analysis of the selected subset of data. In some embodiments, block 362 comprises identifying potential causes or failure modes of a selected process equipment (or subcomponents of the selected process equipment) that resulted in the generation of a given alarm associated with the selected process equipment.

For example, block 63 may comprise identifying one or more anomalous data streams captured by one or more sensors associated with process equipment. In this example, block 362 may also comprise determining an anomaly score for each identified anomalous data stream, the anomaly score corresponding to the degree of deviation of a given anomalous data stream from historical measurements of the data stream (e.g., an average value of the data stream over the preceding day compared to an average value of the data stream over the preceding month, for example). In this example, block 362 may additionally comprise determining a likelihood of a failure of each of a plurality of subcomponents of the process equipment based on the one or more anomalous data streams and the anomaly score for each data stream (e.g., the information contained in graphic 57 shown in FIG. 6), In this example, block 362 may further comprise identifying a symptom associated with the failure of each of the plurality of sub-components, and one or more failure modes associated with each of the plurality of sub-components. In some embodiments, the determining of the likelihood of the failure of the plurality of sub-components, and the identifying of corresponding symptoms and associated failure modes may be performed by data handler 32 of system 10 shown in FIG. 1 and based on the graph models stored in the graph model database 34 of system 10.

Block 364 of method 350 includes determining by the data handler impacts on the energy production or processing facility corresponding to the identified one or more potential underlying causes. In some embodiments, block 364 comprises determining the severity of impact to the operation of the process equipment and/or to the Energy production or processing facility comprising the process equipment should the identified failure modes associated with the sub-components identified at block 362 occur. For example, block 364 may include determining what could happen if no action were taken and each identified failure mode for each associated sub-component were allowed to occur. This may include determining a MTTR for each identified failure mode for each associated sub-component (e.g., the information identified by arrow 82 in the graphic 59 shown in FIG. 7). In some embodiments, the MTTR for each given failure mode for each sub-component may be determined by data handler 32 through the performance of analytics on the data provided by data source layer 12 and retrieved using the graph models stored in graph model database 34.

Block 366 of method 350 includes recommending by the data handler one or more corrective actions to address the identified one or more potential underlying causes. In some embodiments, block 366 includes identifying options for addressing each failure mode (e.g., the failure modes identified at block 364) associated with a given sub-component of process equipment. For example, a recommended corrective action for addressing each specific failure mode along with a cost associated with the recommended corrective action may be determined, along with a determination of whether the recommended corrective action could be performed when the process equipment is online or if instead the process equipment must be shutdown in order for the recommended corrective action to be performed. In some embodiments, the data handler 32 of system 10 (executing on computer system 240 of system 200, for example) may determine the recommended corrective action and cost associated with the recommended corrective action.

Block 368 of method 350 comprises providing by the data handler one or more plans for performing the one or more recommended corrective actions. In some embodiments, block 368 includes scheduling a work order for performing one of the identified recommended corrective actions so that the corrective action may be carried out at a selected, predefined time. The scheduling of the work order may be done manually by a user of a system configured to determine the recommended corrective actions (e.g., systems 10, 200 shown in FIGS. 1, 8, for example) or automatically by the system itself. Block 368 may additionally include advising personnel of the one or more energy production or processing facilities to make an operational change, ordering spare parts from a warehouse, create an entry in an incident reporting system, and/or raise an engineering query.

Block 370 of method 350 includes performing the one or more recommended corrective actions. In some embodiments, block 370 includes automatically adjusting the operation of process equipment in order to resolve an alert (e.g., an alert received at block 352) associated with the process equipment. For example, the process equipment may be shut down or the process equipment may remain in operation but one or more outputs (e.g., outputs corresponding to valve position, output torque, pressure, flowrate, etc.) provided by one or more controllers of the process equipment may be adjusted to resolve the alert. In some embodiments, this may be accomplished by the computer system 240 (on which features of the architecture of system 10 shown in FIG. 1, including data handler 32, may execute) through the monitoring systems 214 of Energy production or processing facilities 210. Block 370 may also comprise adding additional surveillance to monitor for deterioration in a particular process equipment, inject chemicals or other automated process changes, alter an operating mode of an Energy production or processing facility (e.g., after pressures in selected systems of the facility, increase cooling water, etc.) or process equipment, and/or redirect materials (e.g., a process flow) to a substitute process equipment.

An embodiment of a method for facilitating the management of one or more hydrocarbon production and operation ("P&O") facilities comprises (a) receiving by an application executing on a computer system an alert pertaining to a piece of equipment of the one or more P&O facilities, the alert corresponding to an anomaly in the operation of the piece of equipment, (b) identifying by a data handler of the application a potential cause of the alert using a plurality of distinct data sources, wherein the cause is associated with the piece of equipment, and (c) recommending by the data handler a corrective action to resolve the identified potential cause of the alert using the plurality of distinct data sources. In some embodiments, (b) comprises (b1) identifying the potential cause of the alert by identifying a plurality of anomalous data streams of the plurality distinct data sources. In some embodiments, (b) comprises (b2) determining by the data handler an anomaly score for each of the identified anomalous data streams, wherein each anomaly score is based on a difference between a current average of the anomalous data stream and a historical average of the anomalous data stream. In certain embodiments, (b) comprises (b3) determining a likelihood of a failure for each of a plurality of sub-components of the piece of equipment based on the plurality of anomalous data streams and the anomaly score for each of the plurality of anomalous data streams. In certain embodiments, (b) comprises (b4) identifying one or more potential failure modes for each of the plurality of sub-components based on the plurality of anomalous data streams and the anomaly score for each of the plurality of anomalous data streams. In some embodiments, data of the plurality of distinct data sources is organized into a knowledge graph accessible by the data handler and comprising a plurality of nodes connected by a plurality of edges, and wherein at least one of the plurality of nodes comprises an equipment identity node representing the piece of equipment. In some embodiments, the plurality of nodes of the knowledge graph comprises a model identifier node representing an analytic model associated with the piece of equipment, a data stream node representing a data stream of the plurality of distinct data sources, an excursion identifier node identifying an extrusion in a data stream associated with the piece of equipment, a failure mode node representing a failure condition that can occur on the piece of equipment, and a historical event node representing an instance of a failure that has occurred in the past on the piece of equipment. In certain embodiments, the plurality of distinct data sources comprises equipment sensor data, equipment monitoring system data, equipment maintenance data, and piping & instrumentation diagrams (P&IDs).

An embodiment of a method for facilitating the management of one or more hydrocarbon production and operation ("P&O") facilities comprises (a) receiving by an application executing on a computer system an alert pertaining to a piece of equipment of the one or more P&O facilities, the alert corresponding to an anomaly in the operation of the piece of equipment, and (b) identifying by a data handler of the application a potential cause of the alert using a plurality of distinct data sources, wherein the cause is associated with the piece of equipment, wherein data of the plurality of distinct data sources is organized into a knowledge graph accessible by the data handler and comprising a plurality of nodes connected by a plurality of edges, and wherein at least one of the plurality of nodes comprises an equipment identity node representing the piece of equipment. In some embodiments, the plurality of nodes of the knowledge graph comprises a model identifier node representing an analytic model associated with the piece of equipment, and a data stream node representing a data stream of the plurality of distinct data sources, an excursion identifier node identifying an extrusion in a data stream associated with the piece of equipment. In some embodiments, the model identifier node is connected to the equipment identity node by a model edge which indicates that the analytic model represented by the model identifier node performs analysis on the piece of equipment represented by the equipment identifier node, the equipment identifier node is connected to the data stream node by a measured data edge which indicates that the data stream represented by the data stream node is measured by sensors associated with the piece of equipment represented by the equipment identifier node, and the model identifier node is connected to the data stream node by a data model edge which indicates that the data stream represented by the data stream node is used in the analytic model represented by the model identifier node. In certain embodiments, the plurality of nodes of the knowledge graph comprises at least one of a trip node which represents a condition that when identified in the data stream represented by the data stream node causes an effect on another piece of equipment of the one or more P&O facilities, and a failure mode node connected to the equipment identifier node by a failure edge which indicates that a failure mode represented by the failure mode node may occur in the piece of equipment represented by the equipment identifier node. In certain embodiments, the method further comprises (c) recommending by the data handler a corrective action to resolve the identified potential cause of the alert using the plurality of distinct data sources. In certain embodiments, the method further comprises (d) providing a plan by the data handler a plan for performing the recommended corrective action, and (e) performing the recommended corrective action. In some embodiments, (b) comprises (b1) identifying the potential cause of the alert by identifying by the data handler a plurality of anomalous data streams of the plurality distinct data sources, and (b2) determining by the data handler an anomaly score for each of the identified anomalous data streams, wherein each anomaly score is based on a difference between a current average of the anomalous data stream and a historical average of the anomalous data stream. In some embodiments, (b) comprises (b3) determining a likelihood of a failure for each of a plurality of sub-components of the piece of equipment based on the plurality of anomalous data streams and the anomaly score for each of the plurality of anomalous data streams, and (b4) identifying one or more potential failure modes for each of the plurality of sub-components based on the plurality of anomalous data streams and the anomaly score for each of the plurality of anomalous data streams.

An embodiment of a system for facilitating the management of one or more hydrocarbon production and operation ("P&O") facilities comprises a processor, a non-transitory memory, and an application stored in the non-transitory memory that, when executed by the processor receive an alert pertaining to a piece of equipment of the one or more P&O facilities, the alert corresponding to an anomaly in the operation of the piece of equipment, identify by a data handler of the application a potential cause of the alert using a plurality of distinct data sources, wherein the cause is associated with the piece of equipment, and recommend by the data handler a corrective action to resolve the identified potential cause of the alert using the plurality of distinct data sources. In some embodiments, the application stored in the non-transitory memory that, when executed by the processor identify the potential cause of the alert by identifying by the data handler a plurality of anomalous data streams of the plurality distinct data sources, and determine by the data handler an anomaly score for each of the identified anomalous data streams, wherein each anomaly score is based on a difference between a current average of the anomalous data stream and a historical average of the anomalous data stream. In some embodiments, the application stored in the non-transitory memory that, when executed by the processor determine a likelihood of a failure for each of a plurality of sub-components of the piece of equipment based on the plurality of anomalous data streams and the anomaly score for each of the plurality of anomalous data streams, and identify one or more potential failure modes for each of the plurality of sub-components based on the plurality of anomalous data streams and the anomaly score for each of the plurality of anomalous data streams. In certain embodiments, data of the plurality of distinct data sources is organized into a knowledge graph accessible by the data handler and comprising a plurality of nodes connected by a plurality of edges, and wherein at least one of the plurality of nodes comprises an equipment identity node representing the piece of equipment.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for facilitating the management of one or more energy production or processing facilities, comprising:

(a) receiving by an application executing on a computer system an alert pertaining to process equipment of the one or more energy production or processing facilities, the alert corresponding to an operational anomaly associated with the process equipment;

(b) interrogating by a data handler of the application a data structure linking together and organizing a plurality of distinct data sources, the plurality of distinct data sources having a sensor data class associated with sensor data sources of the process equipment, and a contextual data class associated with contextual data sources excluding the sensor data sources of the sensor data class;

(c) selecting a subset of data sources from the plurality of data sources, including both contextual data sources and sensor data sources, identified by the data handler as associated with a potential cause of the alert based on the interrogation of the data structure;

(d) statistically analyzing by the data handler data sourced from the selected subset of data sources;

(e) identifying by the data handler the potential cause of the alert based on the contextual data sources within the subset of data sources and the statistical analysis performed at (d);

(f) determining a severity of impact to the operation of the one or more energy production or processing facilities should failure occur to the process equipment; and (g) recommending by the data handler a particular corrective action from a plurality of distinct potential corrective actions to resolve the identified potential cause of the alert using the plurality of distinct data sources and based on the severity of impact to the operation of the one or more energy production or processing facilities should failure occur to the process equipment.

2. The method of claim 1, wherein (e) further comprises interrogating the data structure by the data handler to identify the potential cause of the alert.

3. The method of claim 1, wherein the statistical analysis in (d) identifies anomalous sensor data, and wherein interrogation of the data structure to select a subset of data sources at (c) is based on identifying, by the linking and organizing of the data structure, other data sources linked with the data source associated with the anomalous sensor data.

4. The method of claim 1, wherein (b) comprises forming by the data handler new associations between different data sources of the plurality of distinct data sources.

5. The method of claim 1, wherein the contextual data source class includes at least one of maintenance history data specific to the process equipment, maintenance history data of the one or more energy production or processing facilities, planned maintenance data, design data specific to the process equipment, current operating condition data associated with a current operational status of the process equipment and/or of the one or more energy production or processing facilities, alert data relating to equipment of the one or more energy production or processing facilities, failure mode data, and safety data.

6. The method of claim 1, wherein (e) comprises:

(e1) identifying the potential cause of the alert by identifying a plurality of anomalous data streams of the plurality distinct data sources based on the statistical analysis performed at (d).

7. The method of claim 6, wherein (e) comprises:

(e2) determining by the data handler an anomaly score for each of the identified anomalous data streams.

8. The method of claim 6, wherein (e) comprises:

(e2) determining a likelihood of a failure for each of a plurality of sub-components of the process equipment based on the plurality of anomalous data streams.

9. The method of claim 8, wherein (e) comprises:

(e3) identifying one or more potential failure modes for each of the plurality of sub-components based on the plurality of anomalous data streams.

10. The method of claim 1, wherein the data structure comprises a knowledge graph accessible by the data handler and comprising a plurality of nodes connected by a plurality of edges, and wherein at least one of the plurality of nodes comprises an equipment identifier node representing the process equipment.

11. A system for facilitating the management of one or more energy production or processing facilities, comprising:

a processor;

a non-transitory memory; and an application stored in the non-transitory memory that, when executed by the processor:

receives an alert pertaining to a process equipment of the one or more energy production or processing facilities, the alert corresponding to an operational anomaly in the operation of the process equipment;

interrogates by a data handler of the application a data structure linking together and organizing a plurality of distinct data sources, the plurality of distinct data sources having a sensor data class associated with sensor data sources of the process equipment, and a contextual data class associated with contextual data sources excluding the sensor data sources of the sensor data class;

selects a subset of data sources from the plurality of distinct data sources, including both contextual data sources and sensor data sources, identified by the data handler as associated with a potential cause of the alert based on the interrogation of the data structure;

statistically analyzes by the data handler data sourced from the selected subset of data sources;

identifies by the data handler the potential cause of the alert based on the contextual data sources within the subsea of data sources and the performed statistical analysis;

determines a severity of impact to the operation of the one or more energy production or processing facilities should failure occur to the process equipment; and recommends by the data handler a particular corrective action from a plurality of distinct potential corrective actions to resolve the identified potential cause of the alert using the plurality of distinct data sources and based on the severity of impact to the operation of the one or more energy production or processing facilities should failure occur to the process equipment.

12. The system of claim 11, wherein the data source comprises a knowledge graph including a plurality of nodes connected by a plurality of edges, and wherein at least one of the plurality of nodes comprises an equipment identifier node representing the process equipment.

13. The system of claim 11, wherein the application stored in the non-transitory memory that, when executed by the processor:

identifies the potential cause of the alert by identifying by the data handler a plurality of anomalous data streams of the plurality distinct data sources;

determines a likelihood of a failure for each of a plurality of sub-components of the piece of equipment based on the plurality of anomalous data streams; and identifies one or more potential failure modes for each of the plurality of sub-components based on the plurality of anomalous data streams.

14. The system of claim 11, wherein the application stored in the non-transitory memory that, when executed by the processor:

identifies anomalous sensor data based on the performed statistical analysis; and selects the subset of data sources based on identifying, by the linking and organizing of the data structure, other data sources linked with the data source associated with the anomalous sensor data.

* * * * *